(12) United States Patent
Murphy

(10) Patent No.: US 11,059,408 B2
(45) Date of Patent: Jul. 13, 2021

(54) MORTUARY CARGO LOADING SYSTEM AND METHOD

(71) Applicant: David P. Murphy, Newark, NY (US)

(72) Inventor: David P. Murphy, Newark, NY (US)

( * ) Notice: Subject to any disclaimer, the term of this patent is extended or adjusted under 35 U.S.C. 154(b) by 0 days.

(21) Appl. No.: 16/596,443

(22) Filed: Oct. 8, 2019

(65) Prior Publication Data

US 2020/0108760 A1 Apr. 9, 2020

Related U.S. Application Data

(60) Provisional application No. 62/742,843, filed on Oct. 8, 2018.

(51) Int. Cl.
| | | |
|---|---|---|
| *B60P 1/14* | (2006.01) | |
| *B60P 1/43* | (2006.01) | |
| *A61G 21/00* | (2006.01) | |
| *A61G 3/02* | (2006.01) | |
| *B66D 1/36* | (2006.01) | |
| *A61G 19/00* | (2006.01) | |

(52) U.S. Cl.
CPC ............. *B60P 1/14* (2013.01); *A61G 3/0254* (2013.01); *A61G 21/00* (2013.01); *B60P 1/43* (2013.01); *A61G 19/00* (2013.01); *B66D 1/36* (2013.01); *B66D 2700/0125* (2013.01)

(58) Field of Classification Search
CPC .... A61G 3/0254; A61G 3/0891; A61G 21/00; B60P 1/14; B60P 1/43; B66D 1/36; B66D 3/006; B66D 2700/0125
USPC ......................................... 414/494, 500, 559
See application file for complete search history.

(56) References Cited

U.S. PATENT DOCUMENTS

| 2,177,411 | A | * | 10/1939 | Krogh | .................... | A61G 21/00 |
| | | | | | | 414/522 |
| 2,206,762 | A | * | 7/1940 | Breeden | ................. | A61G 21/00 |
| | | | | | | 296/18 |
| 2,387,082 | A | * | 10/1945 | Malling | ................. | A61G 3/061 |
| | | | | | | 414/500 |

(Continued)

FOREIGN PATENT DOCUMENTS

| CN | 206954075 U | 3/2017 |
| EP | 2974704 B1 | 7/2015 |

(Continued)

OTHER PUBLICATIONS

Guilderland Town Hall, New Guilderland Ambulance Can Aid Patients Weighing Over 600 Pounds, town newspaper, Jul. 1, 2018, Guilderland, NY.

(Continued)

*Primary Examiner* — James Keenan
(74) *Attorney, Agent, or Firm* — Aleksandar Nikolic

(57) ABSTRACT

A mortuary cargo loading system having a transport bed adjacent to a motorized winch, a cable engaged with and extending from the motorized winch, a cargo stopper comprising a first end, a second end, and a guide therebetween, and a cargo stopper support having at least one bore for receiving a cargo stopper. The mortuary cargo loading system further has the cargo stopper support and the motorized winch connected to a surface of a vehicle cargo space, the first end of the cargo stopper is engaged with the at least one bore, the cable is engaged with the guide, and the transport bed is connected to the cargo stopper support.

8 Claims, 21 Drawing Sheets

(56) References Cited

U.S. PATENT DOCUMENTS

| | | | | |
|---|---|---|---|---|
| 2,553,766 | A * | 5/1951 | Hightower | B60P 3/12 254/415 |
| 3,389,815 | A * | 6/1968 | Houser | A61G 21/00 414/536 |
| 4,062,461 | A * | 12/1977 | Vincent | A01D 87/127 414/24.5 |
| 4,946,333 | A * | 8/1990 | Boatwright | B60P 3/07 254/327 |
| 5,022,809 | A * | 6/1991 | Hinson | B60P 3/42 414/494 |
| 5,848,869 | A * | 12/1998 | Slocum | B60P 1/6454 414/500 |
| 6,126,378 | A * | 10/2000 | Landoll | B60P 1/6454 254/328 |
| 6,916,056 | B2 | 7/2005 | Mitchell et al. | |
| 6,932,401 | B1 * | 8/2005 | Eekhoff | A61G 21/00 296/16 |
| 7,997,850 | B2 * | 8/2011 | Hutchison | B60P 3/122 414/478 |
| 2004/0202533 | A1 | 10/2004 | Haire | |

FOREIGN PATENT DOCUMENTS

| | | | | |
|---|---|---|---|---|
| FR | 2877835 | A1 * | 5/2006 | A61G 21/00 |
| GB | 0512032 | A * | 8/1939 | A61G 21/00 |
| GB | 2548125 | A | 3/2016 | |
| JP | 2003118536 | A | 10/2001 | |
| WO | 2006003385 | A1 | 6/2005 | |
| WO | 2012036726 | A1 | 9/2011 | |
| WO | 2017194964 | A2 | 5/2016 | |
| WO | 2017205696 | A1 | 5/2017 | |

OTHER PUBLICATIONS

Karen Voyles, The Gainsville Sun, Oversized patients a dilemma for emergency crews; Gainesville.com website, published Jan. 13, 2011, Gainesville, FL, downloaded on Apr. 2, 2019 at 10:56 AM.

Bushey Hall Winchmaster, Winch•Assist Ambulance Systems, Jan. 29, 2011, https://bhwgroup.com/winches/bhw-winch-assist-ambulance-systems/3.

Mobility Toys, Portable Ramp and Winch System, Jan. 11, 2013, Ambulance Ramps in California, http://www.rollarampca.com/ramps/atv-motorcycle-ramps/, Jan. 11, 2013, Roll-a-Ramp of California, Phone: 909-944-9300,Toll Free, Phone: (888) 466-1650, 8400 Maple Place #104, Rancho Cucamonga, CA 91730.

Freedom Motors USA, Commercial Wheelchair Minivans, Paratransit Vehicles, 800-625-6335, Feb. 5, 2019.

Gary Ludwig, MS-EMT-P, a FIREHOUSE contributing editor, Memphis, TN Fire Department, Responding to Emergencies Involving Bariatric Patients May 1, 2012.

* cited by examiner

MORTUARY CARGO LOADING SYSTEM AND METHOD

CROSS-REFERENCE TO RELATED APPLICATIONS

This application claims priority under 35 U.S.C. § 119 to U.S. Provisional Application No. 62/742,843, filed Oct. 8, 2018, which is herein incorporated by reference in its entirety.

BACKGROUND OF THE INVENTION

Technical Field

The present invention generally relates to equipment for handling mortuary cargo. More particularly, the present invention relates to a system and method for loading mortuary cargo into vehicles.

Background Information

Transportation of human remains is a part of the mortuary business. Human remains are often heavy and awkward to move onto and off of transportation vehicles. Mortuary cargo also comes in different weights, shapes, sizes, and levels of decomposition. Only one or two people are tasked with loading and unloading vehicles. Back pain and medical issues related to repetitive heavy lifting are a problem for mortuary workers.

Current practice is to load the human remains onto a collapsing stretcher. As the stretcher is located before a transportation vehicle, the mortuary worker or workers must brace, balance, and lift the stretcher into the vehicle. In situations where there is only one person, this task becomes more complicated. These circumstances become even more challenging because mortuary workers are both expected and legally required to treat human remains with dignity.

In circumstances where a casket is being moved, a casket stand rather than a stretcher is used. Casket stands may have wheels but manual lifting and balancing is still required when loading and unloading a casket. Mortuary workers often move human remains while wearing formal attire and in front of bereaved family members. A secure and reliable system for loading mortuary cargo is needed to ensure public dignity and to avoid injury to mortuary workers and bereaved family members.

Thus, a need exists for a system that aids with the difficulties of lifting and balancing mortuary cargo when loading the mortuary cargo into a vehicle.

SUMMARY OF THE INVENTION

In accordance with an aspect of the present invention, a mortuary cargo loading system is provided having a transport bed adjacent to a motorized winch, a cable engaged with and extending from the motorized winch, a cargo stopper comprising a first end, a second end, and a guide therebetween, and a cargo stopper support having at least one bore for receiving a cargo stopper. The mortuary cargo loading system further has the cargo stopper support and the motorized winch connected to a surface of a vehicle cargo space, the first end of the cargo stopper is engaged with the at least one bore, the cable is engaged with the guide, and the transport bed is connected to the cargo stopper support.

In accordance with another aspect of the present invention, a kit is provided having, a mortuary bed, and a power system having a motorized winch, a control box, and a power supply. Further included in the kit is a cable having a connector at a first end and a second end engaged with the motorized winch, a snatch block, a plurality of cargo stoppers, a cargo stopper support bar, and a plurality of fasteners. Connecting the power system, the mortuary bed, and the cargo stopper support bar to a mortuary vehicle, engaging the plurality of cargo stoppers with the cargo stopper support bar, and attaching the cable to the snatch block, and the snatch block to the cargo stopper, allowing for mortuary cargo loading into the mortuary vehicle.

In accordance with another aspect of the present invention, a method for loading mortuary cargo includes, bringing a mortuary cargo to a cargo space opening of a mortuary vehicle, attaching a pulley to a cargo stopper, passing a cable around the pulley, connecting the cable to the mortuary cargo, activating a winch, pulling the mortuary cargo into the cargo space and onto a mortuary tray, stopping the winch, and inserting a rear cargo stopper into a slot in the mortuary tray.

These, and other objects, features and advantages of this invention will become apparent from the following detailed description of the various aspects of the invention taken in conjunction with the accompanying drawings.

DETAILED DESCRIPTION OF THE INVENTION

Figure 1:
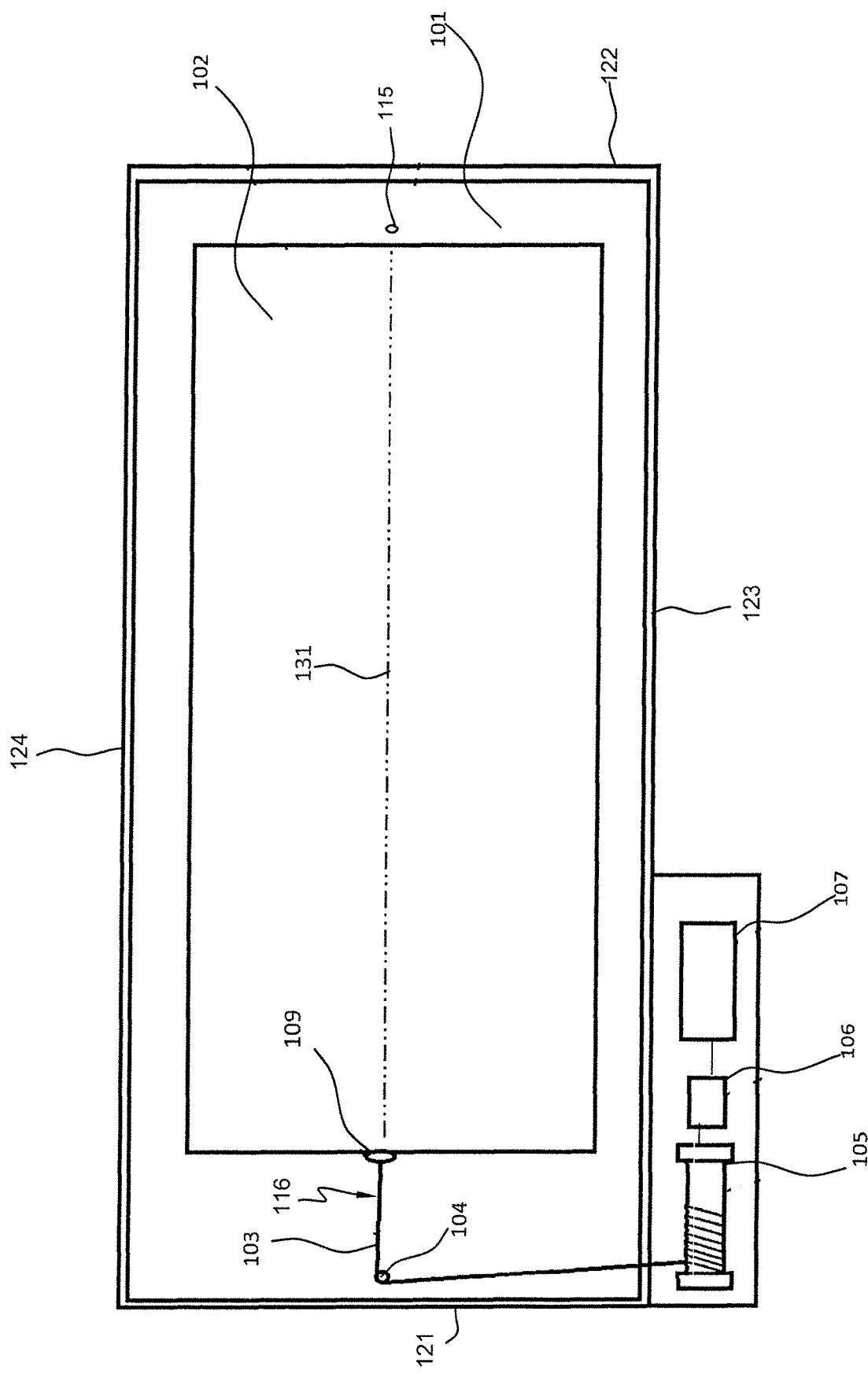
FIG. 1 depicts a top view of a single bed mortuary cargo loading system and cargo stopper, in accordance with an aspect of the present invention.

Aspects of the present disclosure and certain embodiment, features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure. Furthermore, although certain methods are described with reference to certain steps that are presented herein in a certain order, in many instances, these steps may be performed in any order as may be appreciated by one having ordinary skill in the art, and the methods are not limited to the particular arrangement of steps disclosed herein.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one embodiment" are not intended to be interpreted as excluding the existence of additional embodiments that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any embodiments that "comprises," "has," "includes" or "contains" one or more step or element possesses such one or more step or element, but is not limited to possessing only such one or more step or element. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be."

As used herein, the term "portion" is not limited to a single continuous body of material unless otherwise noted. A "portion" may include multiple sub-portions that may be the same or differing materials, and/or may include coatings, adhesives, and the like, and may be a separate and distinct component or may be an integral section, segment, or fragment of a larger component. As used herein, the term "coupled" is not limited to a direct coupling of two separate and distinct components. Two "coupled portions" may include indirectly coupled portions or directly coupled portions.

As utilized herein, the following terms and expressions will be understood as follows:

The term "cable" as used herein, may include, for example, a twisted or braided rope, a metal wire, a single strand cord, a belt, a metal strand rope, or a chain; and these items may be, for example, coated, uncoated, sheathed, or unsheathed.

The term "mortuary cargo", refers to cargo that is ordinarily transported in a mortuary vehicle, including but not limited to: human remains, a body, a stretcher; a casket; a coffin; a body bag; a cremation case; a container containing human remains; those items that are normally carried to the mortuary vehicle using a stretcher or platform; items which are heavy or heavy so that more than one person may be required to lift the item into the mortuary vehicle; and combinations of the items listed.

The term "mortuary stretcher" refers to any a stretcher for carrying bodies, human remains, or containers containing human remains, and includes version where the front legs collapse, the rear legs collapse, both sets of legs collapse, no legs collapse, and any variant of a human remains carrying device.

The term "casket stand" refers to a type of mortuary stretcher for carrying a corpse, coffin, or casket containing a corpse. The casket stand may also be known as a coffin stand, a bier, a bier on wheels, or a church truck.

The term "mortuary vehicle" may refer to, for example, any vehicle used in providing mortuary services or funeral services including an ambulance, a hearse. Mortuary services include those services provided by a coroner or a funeral home as well as a hospital or morgues. Funeral home and coroner vehicles may include, for example, passenger vehicles such as, for example, a van, a mini-van, a pick-up truck, a sports utility vehicle, station-wagon, hatchbacks, crossover vehicles, an automobile with a cargo bed, or the like. Funeral home and coroner vehicles may also include vans, trucks, and cargo vans. Funeral home vehicles and coroner vehicles may also, for example, serve as mortuary vehicles and as personal vehicles.

The invention herein will be better understood by reference to the figures wherein like reference numbers refer to like components.

Figure 2:
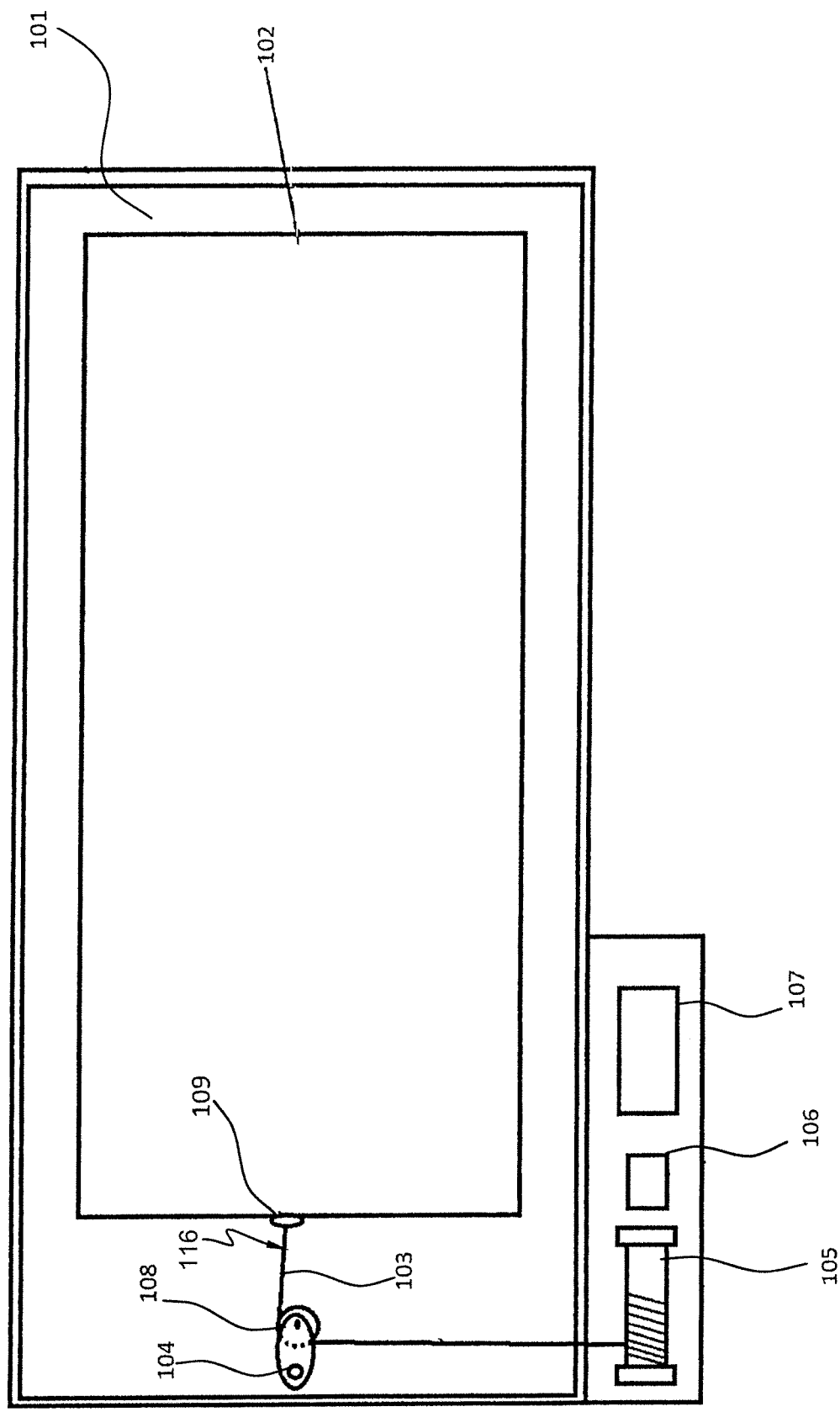
FIG. 2 depicts a top view of the mortuary cargo loading system of FIG. 1 with a cargo stopper and a removable pulley system, in accordance with an aspect of the present invention.
Figure 3:
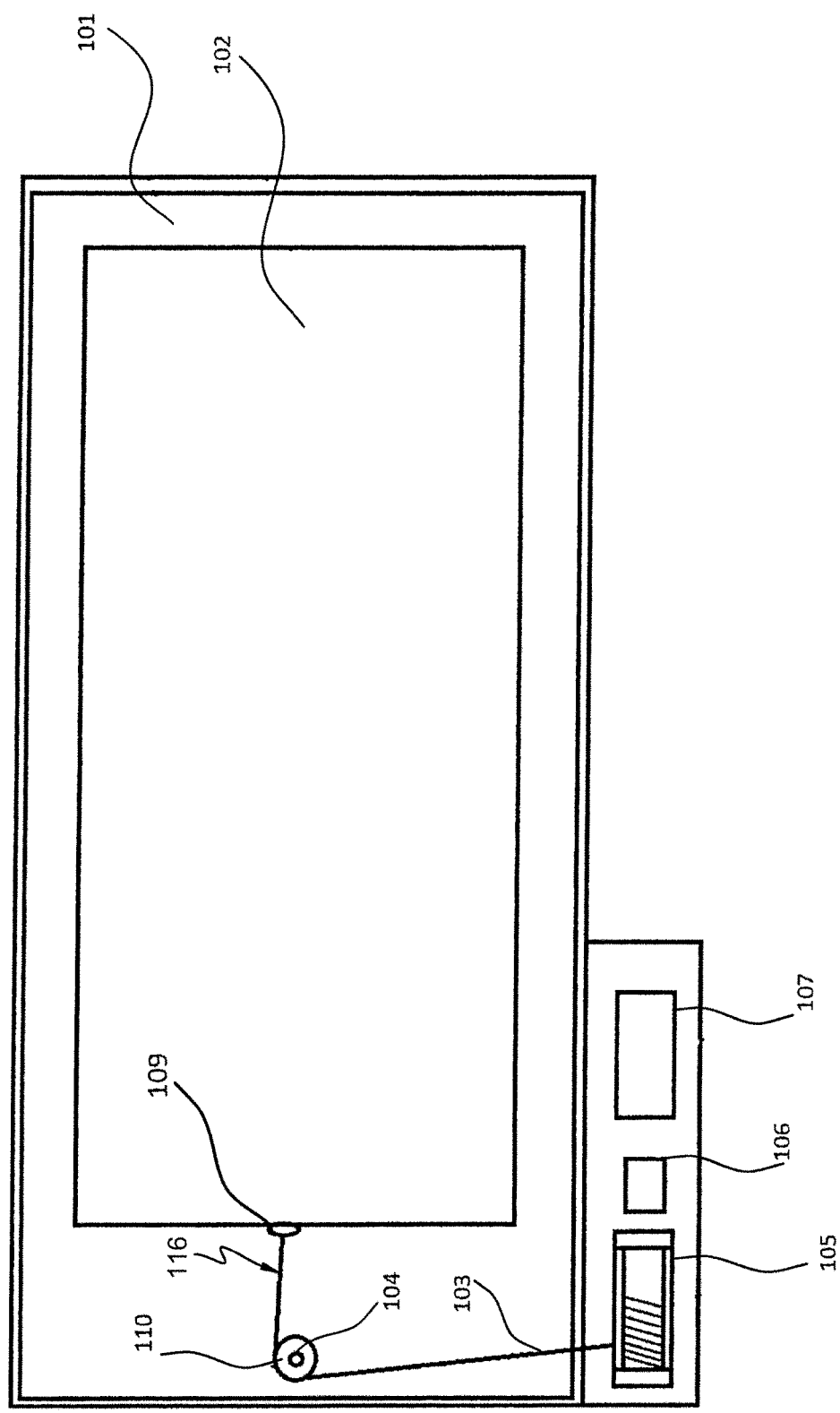
FIG. 3 depicts a top view of the mortuary cargo loading system of FIG. 1 with a fixed cargo stopper pulley system, in accordance with an aspect of the present invention.

Referring to the drawings, wherein like reference numerals are used to indicate like or analogous components throughout the several views, and with particular reference to FIGS. 1-3, a single bed mortuary vehicle cargo loading system 100 is shown. A mortuary cargo 102 is shown on a transport bed or mortuary tray or mortuary bed 101. The mortuary cargo 102 is depicted as being rectangular, however the mortuary cargo 102 may be of any shape. The mortuary cargo 102 may, for example, include a container for remains and/or a carrying device, such as, a stretcher, a platform, or a bariatric stretcher. The mortuary cargo loading system 100 may be used, for example, to move mortuary cargo without a stretcher. Mortuary cargo sizes on carrying devices or stretchers may range from, for example, cremation boxes to bariatric coffins.

Still referring to FIGS. 1-3, the mortuary tray 101 may be, for example, sized to fit on the floor surface or bottom surface of a cargo space of a mortuary vehicle. Station wagons, crossover vehicles, and sports utility vehicles may have seats that may be removed, and for such vehicles, the space with the removed seats may be, for example, the cargo space. The mortuary tray 101 may have a length from, for example, approximately 76 in to 130 in, and more specifically, a length of approximately 92 in. The length of the mortuary tray 101 extends from the front end 121 to the back end 122 of the mortuary tray, with the front end 121 of the mortuary tray 101 positioned behind a driver space and the mortuary tray 101 extending towards a back end or loading end of the mortuary vehicle within the cargo space. The driver space, or driver compartment, may be, for example the space in a vehicle where a driver or operator operates a vehicle. In vehicles used for mortuary services, there may or may not be a separation between the driver or operator compartment and the cargo compartment. In vehicles without separate compartments, the cargo space may be, for example, the interior space that is behind the driver's seat and extending to a rear opening, trunk, gate, or door. The mortuary tray 101 may have a width from, for example, approximately 30 in to 48 in wide, and more specifically, a width of approximately 36 in. The width extends from a first side 123 to a second side 124 of the mortuary tray 101 and between sides of the mortuary vehicle cargo space. The mortuary tray 101 may have, for example, a thickness from approximately 0.5 in to 4 in, and more specifically, a thickness of approximately 2 in.

With further reference to FIGS. 1-3. a cable 103 is shown connected to a mortuary cargo connector 109 at a free end 116 of the cable 103 and the cable 103 may, for example, have a second end connected to a motorized winch 105 such that the majority of the body of the cable 103 is wound around the winch wheel or armature. The cargo connector 109 is shown connected to the mortuary cargo 102. The cargo connector 109 may be, for example, a hook, a carabiner, or a similar device for attaching, as understood by one having ordinary skill in the art. In other embodiments of the invention, the cargo connector may be connected to a mortuary stretcher (not shown). In still other embodiments of the invention, the cable may be wound around or clasped onto the mortuary cargo 102 and/or a stretcher (not shown).

With continued reference to FIGS. 1-3, a cargo stopper 104 is shown connected to the mortuary bed 101 in a first position, or a position approximately towards the front end 121 and centered between the first side 123 and second side 124 of the mortuary bed 101. The cargo stopper 104 may be, for example, a bar, or a post with an end engaged with the mortuary bed 101 and an opposing end extending out from and approximately perpendicular to the mortuary bed 101. The cargo stopper 104, may be, for example, fabricated from a polymer or metal for use in high load bearing environments, and more specifically, the cargo stopper 104 may be, for example, fabricated from steel. The cargo stopper 104 may, for example, serve as a guide or fulcrum or axis about which the cable 103 moves upon being reeled by the winch, guiding the mortuary cargo 102 into a position on the mortuary bed 101. The cargo stopper 104 may, for example, redirect the pulling force of the winch 105, to provide for positioning of mortuary cargo 102. The cargo stopper 104 may be, for example, approximately in line with a cargo midpoint axis or a longitudinal axis 131 being approximately colinear with an axis in line with the cable 103 and a cargo connector 109, thus aligning the cargo with the cargo stopper 104. The cargo stopper 104 also serves to prevent the cargo 102 from moving past the cargo stopper 104, into a vehicle driver or operator space in the event of a moving mortuary vehicle coming to a sudden stop. The use of the cable 103, positioned about the cargo stopper 104 provides for a controlled loading of mortuary cargo 102, as the cable 103 pulls the mortuary cargo 102.

With continued reference to FIGS. 1-3 the cargo stopper may be engaged with mortuary bed 101 by being placed in a hole or bore (not shown) extending towards the floor of a mortuary vehicle. In some embodiments, the cargo stopper 104 may be removable but in other embodiments, the cargo stopper 104 may be welded or otherwise connected to the mortuary bed 101. The cargo stopper 104 may extend from, for example, approximately 1 in to 6 in out from the surface of the mortuary bed, and more specifically, approximately 4 in out from the surface of the mortuary bed. The section of the cargo stopper 104 that may be engaged with cargo tray 101, may be from 0.5 in to 3 in. Furthermore, the cargo stopper 104 may be any shape, however, cargo stopper 104, may be, for example, circular or cylindrical with a diameter of approximately 0.5 in to 2 in. More particularly, cargo stopper 104 may have, for example, a diameter of approximately ⅝ in.

Referring to FIGS. 1-6, 7, 9, and 20, the winch 105, a control box 106, and a power supply 107 are shown, with the combination forming a power system 301. The control box 106 is shown as a separate device from the motorized winch 105. However, in other embodiments the control box 106 may, for example, be a component of the motorized winch 105. The control box 106 may be used to regulate power to the motorized winch 105, allowing the user to lock-in a lower power or higher power setting. The control box 106 may also be used to receive signals from a remote-control device and to control movement of the motorized winch, such as, for example, stopping, starting, direction, and speed. The control box 106 may also be programmable, creating stop positions or allowing for pauses and restarts at predetermined loading positions for the mortuary cargo (e.g. 102, 202, 203, 404, 1401, 1402, and 1403). The power supply 107 may be, for example, a battery. The battery may, for example, range in size and power from a lawn-care vehicle battery to a truck battery, and more specifically a 12 V car battery. Other battery size and type considerations may, for example, also depend on the type of mortuary vehicle, the size of the transport bed 101, the weight of the mortuary cargo 102 normally carried, and the volume of mortuary cargo 102 being loaded for transportation. The power supply 107 may be directly connected to a mortuary vehicle's electrical system or it may be connected to a standard vehicle electrical outlet. The power supply 107 may also be a generator or a fuel cell or any electrical storage device or power source, understood by one having ordinary skill in the art to be capable of providing power to the motorized winch 105. In one embodiment, the power supply may be the mortuary vehicle's own battery and/or electrical system.

With continued reference to FIGS. 1-6, 7, 9, and 20, the winch 105 may, for example, have a weight hauling capacity of between 700 lbs. and 3000 lbs.

With further reference to FIGS. 1-6, 7, 9, and 20, the winch 105, the control system 106, and the power supply 107 may, for example, be on any side of the mortuary tray 101. The winch control and power system 105, 106, and 107 may, for example, also be on the vehicle ceiling or located anywhere in the mortuary vehicle where there may be space and power connectivity. However, more specifically, the power system 301 may be, for example, located on the floor of a vehicle cargo space, in a space near a wheel well.

Figure 11:
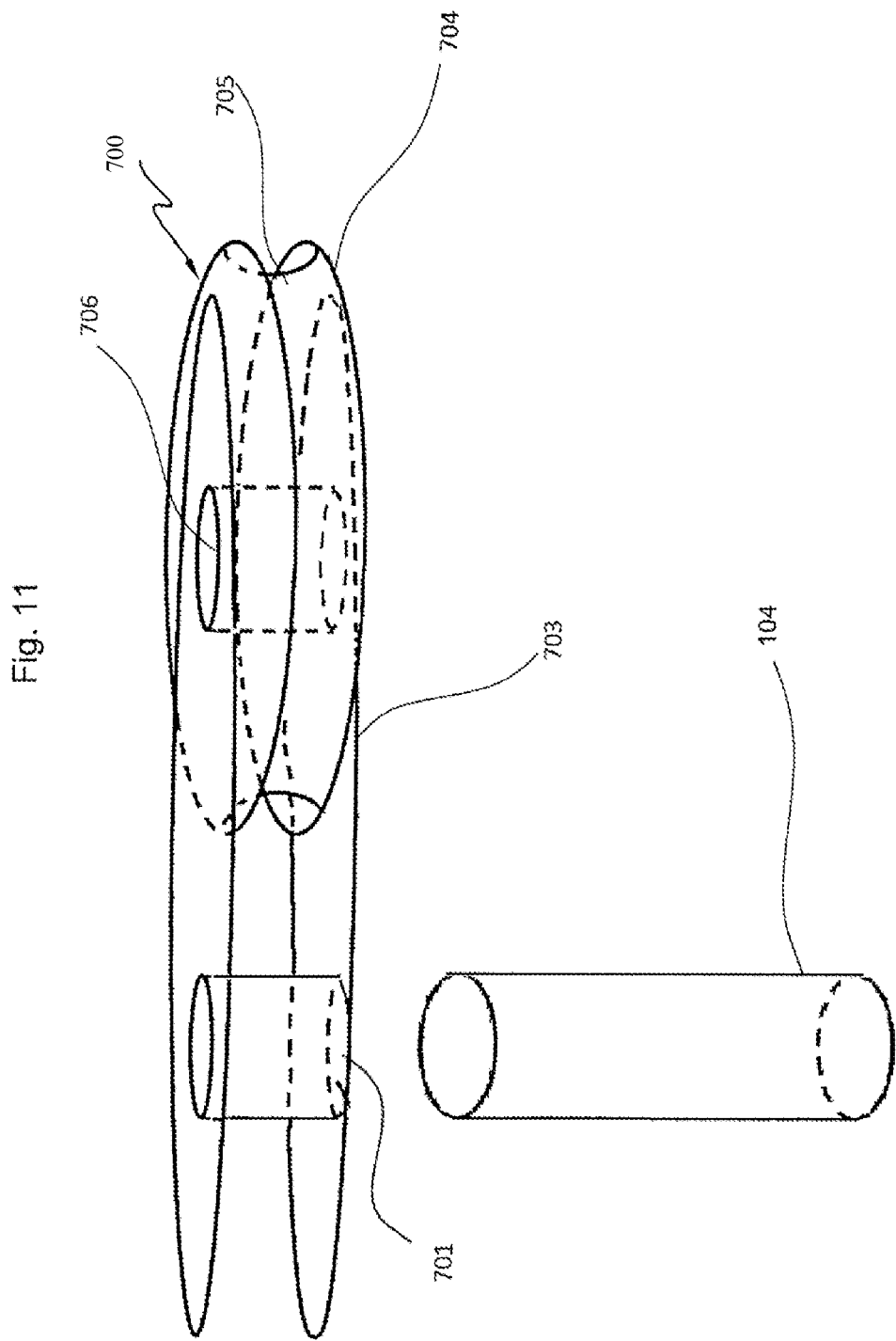
FIG. 11 depicts an exploded side perspective view of a cargo stopper with a removable pulley, in accordance with an aspect of the present invention.

FIG. 2 depicts a top view of a single bed mortuary vehicle cargo loading system 100 with a removable pulley 108. The removable pulley 108 may be, for example, a snatch block (e.g. a snatch block 703 as in FIG. 11), with an eye 701 and a pulley wheel 700, as shown in FIG. 11. The removable pulley 108 is shown connected to the cargo stopper 104. The cable 103 is shown connected to the mortuary cargo 102 at one end, passing through the removable pulley 108 and connected to the motorized winch 105 at the other end. The removable pulley 108 may, for example, slide onto the cargo stopper 104 and remain on the cargo stopper 104 due to the relative positioning of the height of the motorized winch 105 and mortuary cargo 102, combined with a moment of force applied at the pulley 108 in the direction that the cable 103 is reeled onto the motorized winch 105. The removable pulley 108 with the eye 701 positioned on cargo stopper 104 may, for example, rotate about a longitudinal axis of the cargo stopper 104, but may be constrained from rotating otherwise due to the removable pulley 108 being engaged with the cargo stopper 104. In circumstances where the height of the mortuary cargo connector 109 and the motorized winch 105 and cable 103 are the same, the removable pulley 108 may, for example, remain on the cargo stopper 104 because the removable pulley 108 rotates about the cargo stopper 104 in the direction of movement of the cable 103.

The cargo stopper 104 may be fixed or it may be removable. In embodiments where the cargo stopper 104 is removable, the removable pulley 108 may, for example, slide onto the cargo stopper 104 before the cargo stopper 104 is affixed to the mortuary tray 101, or after the cargo stopper 104 is affixed. The eye 701 of the removable pulley 108 may be prevented from moving lower than a certain point on the cargo stopper 104 due to, for example, the cargo stopper 104 flaring towards the bottom or having a thickened section, or by using washers and/or nuts placed below the desired position of the pulley 108. In embodiments where the cargo stopper 104 is fixed, the removable pulley 108 may, for example, slide onto the cargo stopper 104. The eye 701 of the removable pulley 108 may be, for example, prevented from moving higher than a desired height along the cargo stopper 104, by, for example, adding a nut and/or washer combination or a thickened section or a flared section at the top of the cargo stopper 104. In embodiments of the cargo stopper 104 where a nut and washer combination is used, the cargo stopper may have threaded sections. In embodiments with the cargo stopper 104 having a flared section or a thickened section preventing upward movement of the removable pulley 108, the cargo stopper 104 may be, for example, removable such that the removable pulley 108 may be placed on the lower end of the cargo stopper 104 before affixing to the mortuary tray 101.

Figure 12:
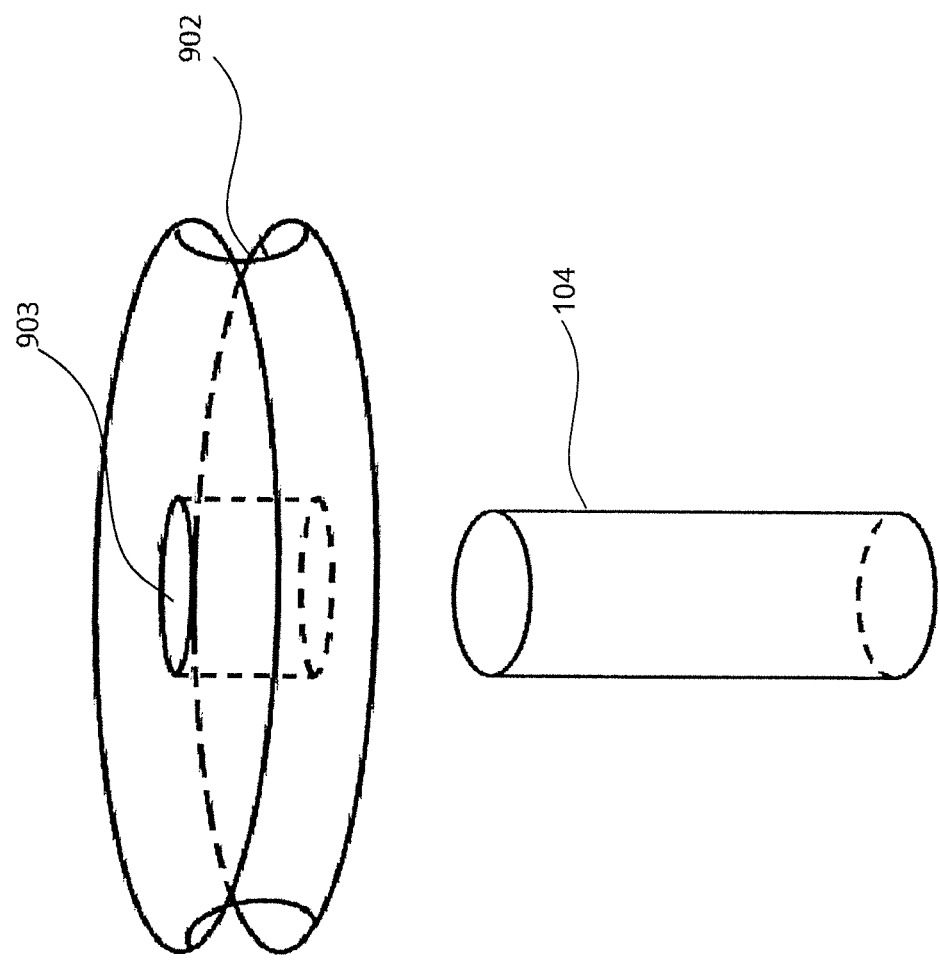
FIG. 12 depicts an exploded side perspective view of another embodiment of a cargo stopper with a removable pulley, in accordance with an aspect of the present invention.
Figure 13:
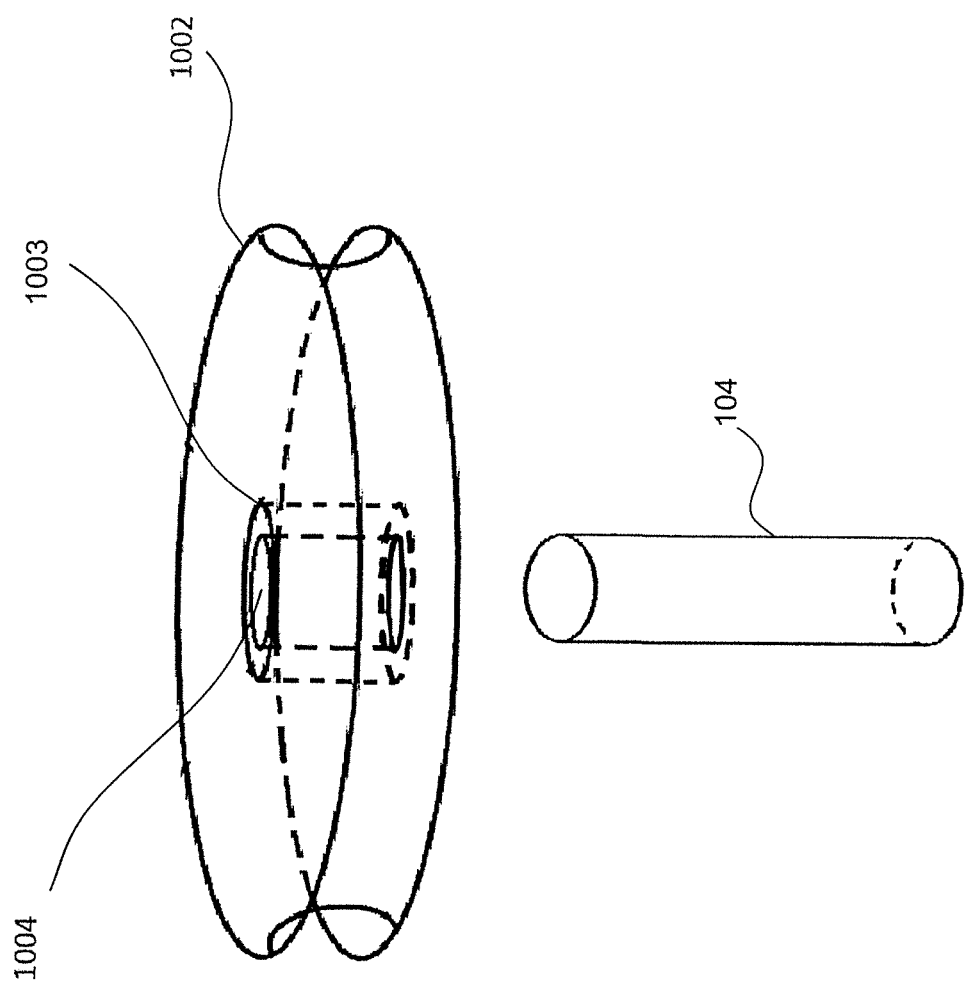
FIG. 13 depicts an exploded side perspective view of the cargo stopper of FIG. 12 with a removable pulley and bearing, in accordance with an aspect of the present invention.

FIG. 3 depicts a top view of a single bed mortuary vehicle cargo loading system with a fixed pulley 110, with the fixed pulley 110 being connected to cargo stopper 104. The fixed pulley 110 may be, for example, fastened to the cargo stopper 104 to remain fastened and to not be easily removable. In one embodiment, the fixed pulley 110 may, for example, have a bearing 1004, providing pulley wheel 1002 rotation about the cargo stopper 104, as shown in FIG. 13. In other embodiments, the fixed pulley 110 may have a fixed pulley wheel 902, acting as a guide for cable 103 about the cargo stopper 104, as shown in FIG. 12.

Figure 21:
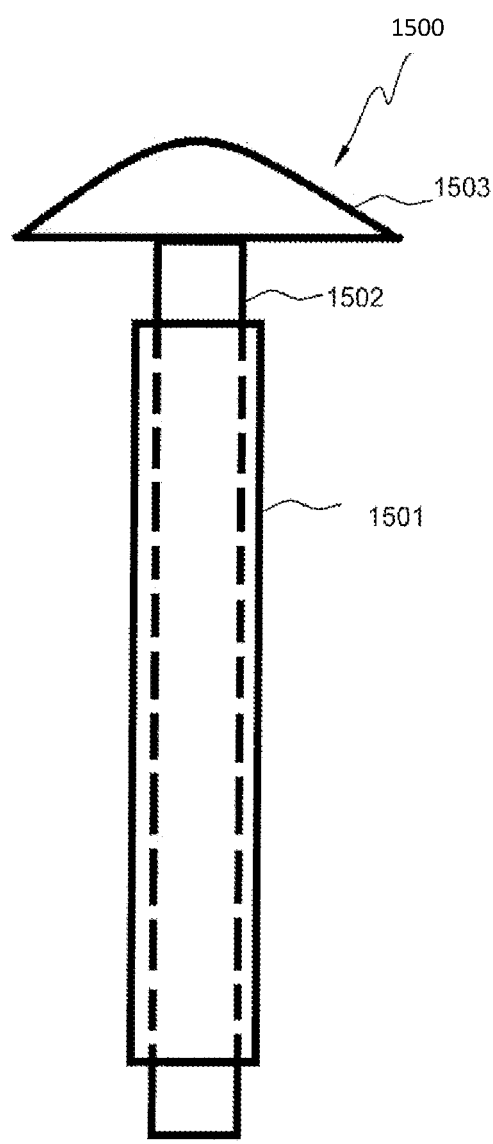
FIG. 21. Depicts a side perspective view of a cargo stopper, in accordance with an aspect of the present invention.

In other embodiments, the removable pulley shown in FIG. 2, may be a wheel structure without the frame or block 703 shown in FIG. 11, with the pulley wheel structure being able to slide onto the cargo stopper 104. The pulley wheel structure may be a pulley wheel with or without a bearing, as shown in FIG. 21.

In FIG. 2 and FIG. 3, the pulley wheels (108, 110) may have a single sheave and flanges to help keep the cable 103 in place and moving smoothly along the pulley wheels (108, 110). The pulley wheel may also be in a casing or in a block that may, for example, help support the pulley wheel and to further act to keep the cable 103 from slipping off the pulley as in FIG. 2, or the pulley may have a cable guard 1005 as in FIG. 18.

Figure 4:
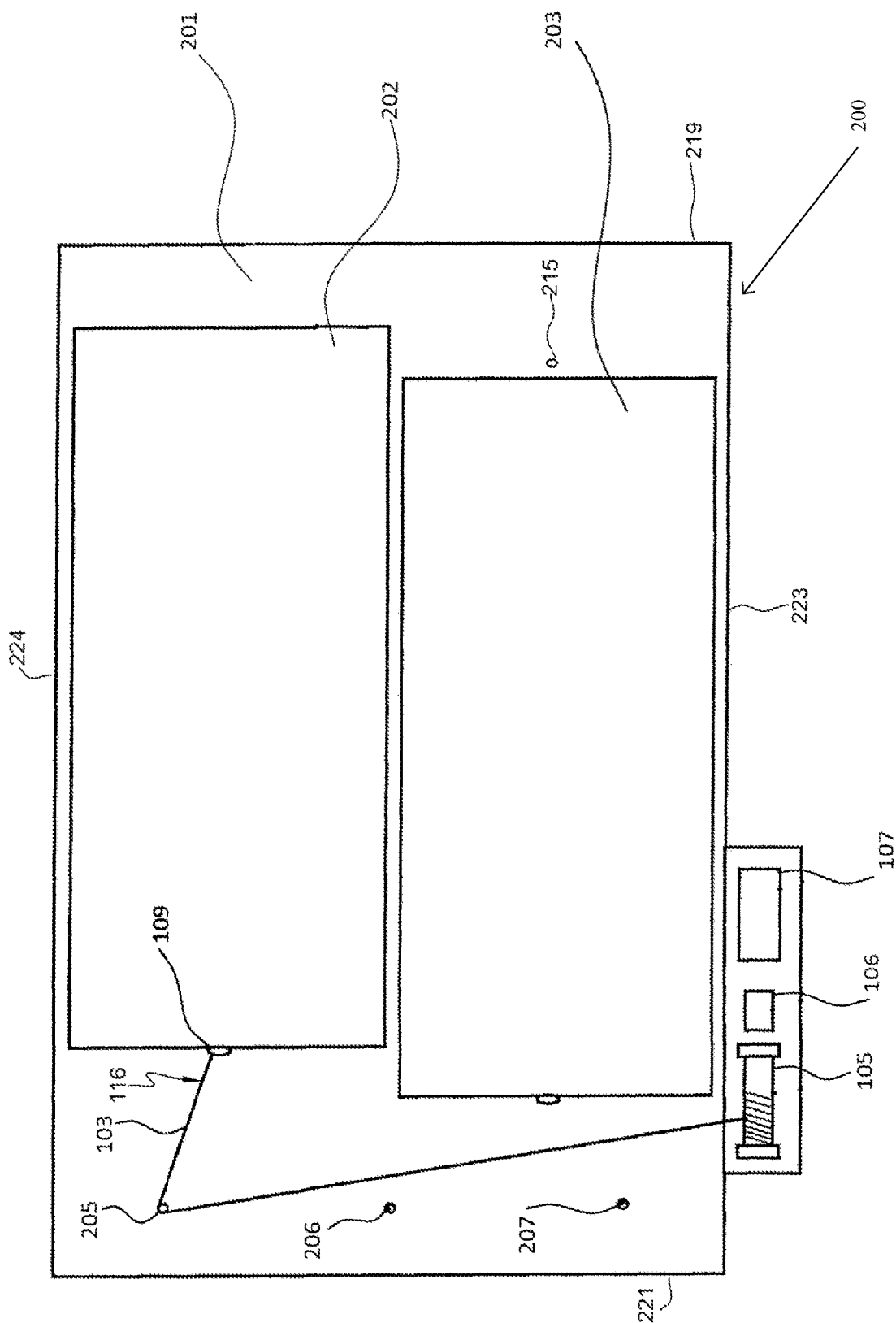
FIG. 4 depicts a top view of a double bed mortuary cargo loading system and cargo stopper, in accordance with an aspect of the present invention.
Figure 5:
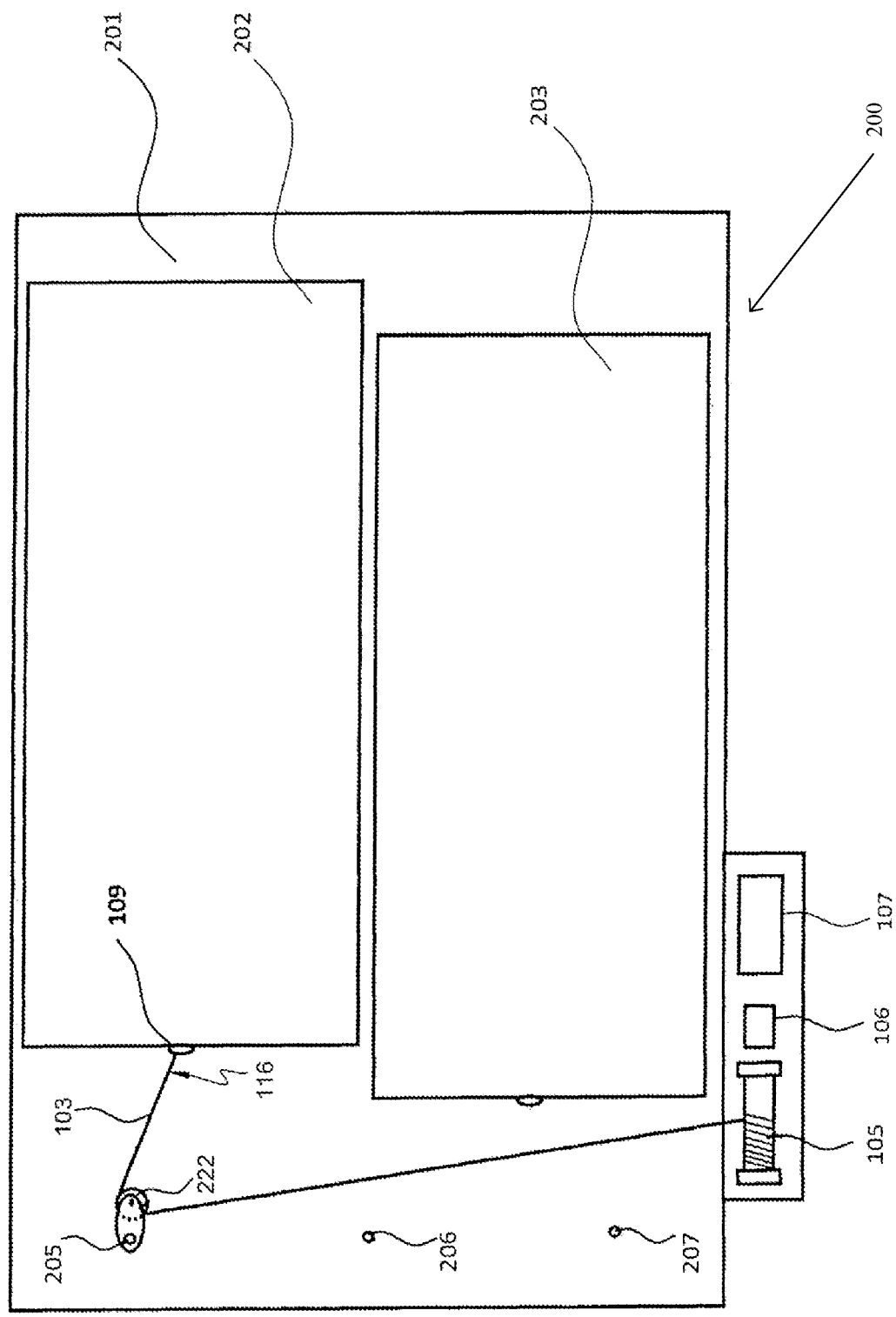
FIG. 5 depicts a top view of the mortuary cargo loading system of FIG. 4 with a cargo stopper and a removable pulley system, in accordance with an aspect of the present invention.
Figure 6:
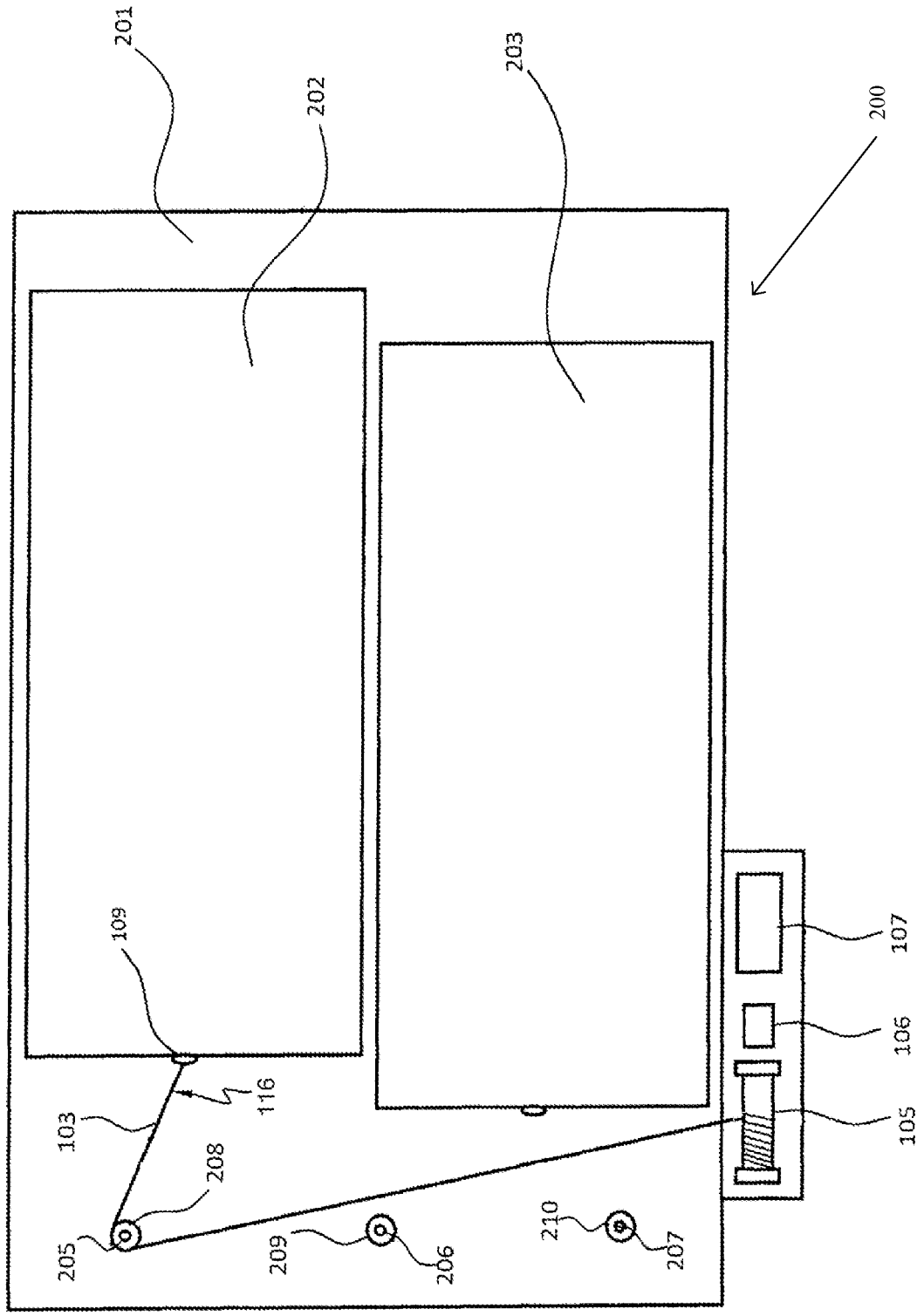
FIG. 6 depicts a top view of the mortuary cargo loading system of FIG. 4 with a fixed cargo stopper pulley system, in accordance with an aspect of the present invention.

Referring to FIGS. 4-6, a double bed mortuary cargo loading system 200 is shown, having a transport bed, a mortuary tray, or mortuary bed 201, and a plurality of mortuary cargo (e.g. multiple instances of mortuary cargo 102). The plurality of mortuary cargo includes, a first mortuary cargo 202 and a second mortuary cargo 203 on the mortuary tray 201. A cable 103 is shown connected to a mortuary cargo connector 109 at one end and wound around a motorized winch 105 at the second end. The double bed mortuary cargo loading system 200, is shown with a plurality of cargo stoppers (e.g. multiple instances of cargo stopper 104), with a first cargo stopper 205, a second cargo stopper 206, and a third cargo stopper 207. The cable is shown passing along the first cargo stopper 205. The first cargo stopper 205 serves as a guide or fulcrum or axis about which the cable 103 moves. The first cargo stopper 205 may, for example, redirect the pulling force of the winch 105, to provide for positioning of mortuary cargo 102. The first cargo stopper 205 is shown guiding the first mortuary cargo 202.

Still referring to FIGS. 4-6, as mortuary cargo 102 has been described in detail above, for the sake of brevity, mortuary cargo 202 and mortuary cargo 203, as multiple instances of mortuary cargo 102, will not be described again.

With continuing reference to FIGS. 4-6, the mortuary tray 201 may be, for example, sized to fit on the floor surface or bottom surface of a cargo space of a mortuary vehicle. Station wagons, crossover vehicles, and sports utility vehicles may have seats that may be removed, and for such vehicles, the space with the removed seats may be, for example, the cargo space. The mortuary tray 201 may have a length from, for example, approximately 76 in to 130 in, and more specifically, a length of approximately 92 in. The length of the mortuary tray 201 extends from the front end 221 to the back end 119 of the mortuary tray, with the front end 221 of the mortuary tray 201 positioned behind a driver space and the mortuary tray 201 extending towards a back end or loading end of the mortuary vehicle within the cargo space. The mortuary tray 201 may have a width from, for example, approximately 40 in to 60 in wide, and more specifically, a width of approximately 48 in. The width extends from a first side 223 to a second side 224 of the mortuary tray 101 and between sides of the mortuary vehicle cargo space. The mortuary tray 101 may have, for example, a thickness from approximately 0.5 in to 2 in, and more specifically, a thickness of approximately ⅝ in.

In other embodiments, mortuary tray 201, may be two segments, for example, a first segment and a second segment connected together to form a mortuary tray 201. Mortuary tray 201, may be, for example used to transport a plurality of mortuary cargo. The first segment and the second segment may be, for example, plates that have a length from approximately 76 in to 130 in. The widths of the first segment and the second segment do not need to be the same, however, the width of the first segment and the width of the second segment may, for example, combine to form a mortuary tray with a width from 40 in and 60 in when placed together. More specifically mortuary tray 201 may be, for example, split lengthwise into a first segment and a second segment with the first segment 24 in wide and the second segment being 24 in wide. but the first segment may have an additional 6 in overlap segment extending out from a side towards the second segment. The first segment and the second segment may be connected, with the first segment positioned against the second segment and the first segment being connected to the overlap segment. The first segment may be connected to the overlap, by using a fastener, such as, for example a bolt and nut combination or a pin, such that the first segment and the second segment form the mortuary tray 201, with a width of, for example, approximately 48 in.

With reference to FIGS. 4-6, the first cargo stopper 205, the second cargo stopper 206, and the third cargo stopper 207 also serve to prevent mortuary cargo 202 and mortuary cargo 203 from entering the driver space and from hitting the mortuary vehicle driver and front seat passenger in the event of a sudden stop. The cargo stoppers may be in a plurality of positions, with the first position being the position of the second cargo stopper 206, the second positions corresponding to the position of the first cargo stopper 205, and the third position corresponding to the third cargo stopper 207. The final position of the mortuary cargo 202, 203 may be used to determine which cargo stopper 205, 206, 207 is selected to act as a cable guide. The third cargo stopper 207 may be, for example, used to guide the cable 103 and to position the second mortuary cargo 203 as shown. The first cargo stopper 205 is shown guiding the first mortuary cargo 202 into the position shown. The cargo stoppers (e.g. the first cargo stopper 205, the second cargo stopper 206, and the third cargo stopper 207) may, for example, be used to position the mortuary cargo with the mortuary cargo moved approximately along an axis defined by the cable between a cargo stopper and the cargo connection to the mortuary cargo. A single mortuary cargo item may be, for example, loaded using a cable 103 and any one of the cargo stoppers 205, 206, 207, and more specifically, using the second cargo stopper 206 as the cable guide to approximately center the mortuary cargo on the mortuary bed 201. The use of the cable 103, positioned about the cargo stopper (e.g. the first cargo stopper 205, the second cargo stopper 206, and the third cargo stopper 207) provides for a controlled loading, as the cable pulls the mortuary cargo (e.g. 202).

For the sake of brevity, the winch 105, the control box 106, and the power supply 107, with the combination forming a power system 301 have been described in detail above in relation to mortuary tray 101 and will not be repeated in relation to mortuary tray 102.

In other embodiments, the power system 301 may be connected to the mortuary tray 101, 201.

Referring to FIGS. 5 and 11, the double bed mortuary cargo loading system 200 is shown with a removable pulley 222 engaged with the cargo stopper 205. The removable pulley 222 may be, for example, a snatch block 703, with an eye 701 and a pulley wheel 700, as shown in FIG. 11. The cable 103 is connected to the first mortuary cargo 202 at one end, passing through the removable pulley 222, and connected to a motorized winch 105 at the other end. The removable pulley 222 may, for example, be placed on the first cargo stopper 205, the second cargo stopper 206, or the third cargo stopper 207 depending on the position the user would like the cargo on the mortuary bed 201. Placing the removable pulley 222 on the first cargo stopper 205 may, for example, pull the mortuary cargo into a position as the one shown by first mortuary cargo 202. Placing the removable pulley 222 on the third cargo stopper 207 may, for example, pull mortuary cargo into a position as the one shown by second mortuary cargo 203. Placing the removable pulley 222 on the second cargo stopper 206 may, for example, pull mortuary cargo into a middle position on the mortuary bed 201.

Removable pulley 108 has been described in detail above. For the sake of brevity, the operation of removable pulley 222 will not be described further except to note that removable pulley 222 and 108 have the same components as described further in FIG. 11.

With reference to FIG. 6 the double bed mortuary cargo loading system 200 is shown with a plurality of cargo stoppers (e.g. the first cargo stopper 205, the second cargo stopper 206, and the third cargo stopper 207) having a plurality of fixed pulleys (e.g. multiple instances of fixed pulley 110). The plurality of fixed pulley includes, for example, a first fixed pulley 208 mounted on the first cargo stopper 205, a second fixed pulley 209 mounted on the second cargo stopper 206, and a third fixed pulley 210 mounted on the third cargo stopper 207. The fixed pulley 110 has been described in detail above, and the first fixed pulley 208, the second fixed pulley 209, and the third fixed pulley 210 are the same and will not be described further for the sake of brevity.

With reference to FIG. 6, the cable 103 may be positioned about the desired pulley (e.g. the first fixed pulley 208, the second fixed pulley 209, and the third fixed pulley 210) to pull mortuary cargo (e.g. mortuary cargo 202 and mortuary cargo 203) into a desired position on the mortuary bed 201. To position the first mortuary cargo 202 as shown, the cable 103 may be, for example, positioned about the first fixed pulley 208 before being pulled by the winch 105. To position the second mortuary cargo 203 as shown, the cable 103 may be, for example, positioned about the first fixed pulley 210.

The embodiment of FIG. 6 depicts cargo stoppers with fixed pulleys, however other embodiments with the pulleys being removable from the cargo stoppers may be desirable under such a cargo stopper configuration.

With reference to FIG. 1, a rear cargo stopper 115 is shown. The rear cargo stopper may be, for example, a removable bar for engagement with the mortuary tray 101 toward the back end 122 or engagement with the floor of the cargo space (not shown), where the rear cargo stopper 115 extends approximately perpendicularly from the surface of the mortuary tray 101. The rear cargo stopper 115 is engaged with the mortuary tray 101 or the floor of the cargo space (not shown) after the mortuary cargo 102 has been loaded. In the event of a sudden stop of a moving mortuary vehicle, the mortuary cargo 102 is prevented from moving by the rear cargo stopper 115. The rear cargo stopper 115 may have, for example, a diameter of approximately 0.5 in to 2 in. Referring to FIG. 4, a rear cargo stopper for double bed 215 is shown. For the sake of brevity, since the rear cargo stopper 115 was already described, rear cargo stopper 215 will not be described further except to note that there may be, for example, a plurality of rear cargo stoppers 215 and engagement bores or holes in mortuary bed 201. There may also be, for example, a plurality of engagement bores or holes in the cargo space floor (not shown). The plurality of rear cargo stoppers 215 may be, for example, positioned behind each of mortuary cargo 202 and mortuary cargo 203. In still other embodiments, to provide for different sizes of mortuary cargo (e.g. 102, 202, and 203), there may be a plurality of bore holes (not shown) extending from the back end (e.g. 122 and 219) towards the front end (e.g. 121 and 221).

Figure 7:
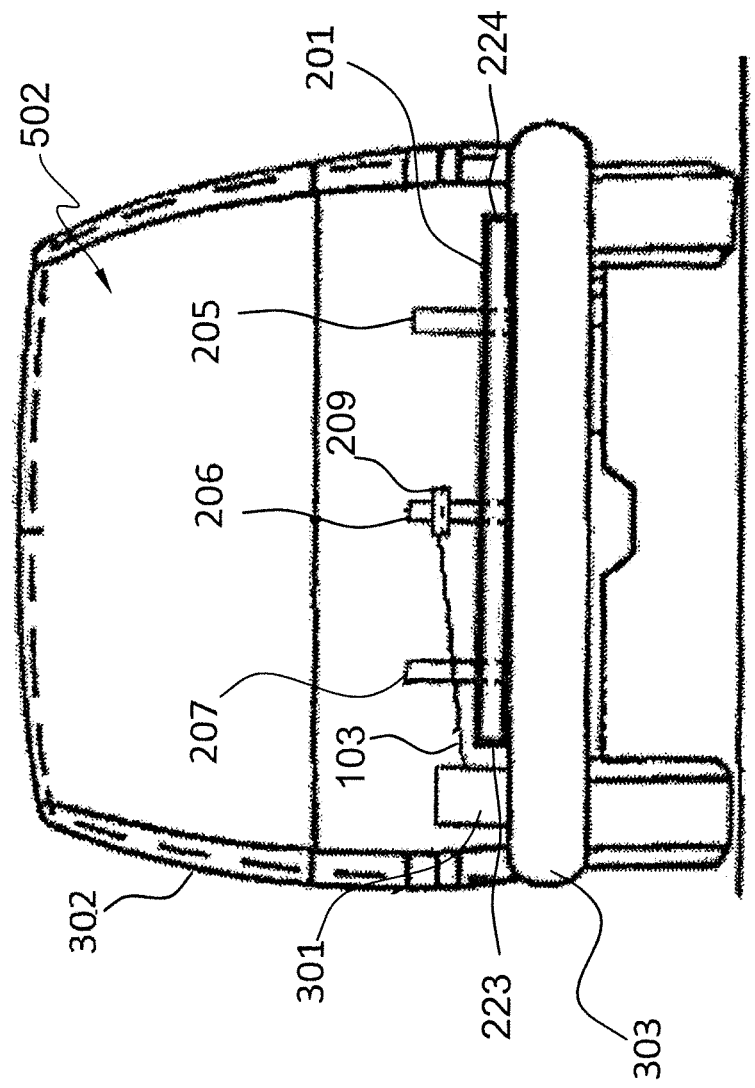
FIG. 7 depicts a rear view of a mortuary vehicle having a mortuary cargo loading system of FIG. 4, in accordance with an aspect of the present invention.

With reference to FIG. 7, a rear view of a mortuary vehicle 302 having the mortuary cargo loading system 200 within. A rear bumper 303 and a mortuary vehicle cargo space 502 are shown with the double bed mortuary bed 201 having the first cargo stopper 205, the second cargo stopper 206, and the third cargo stopper 207. A removable pulley 209 is shown on the second cargo stopper 206. A cable 103 is shown between the removable pulley 209 and the power system 301.

Figure 8:
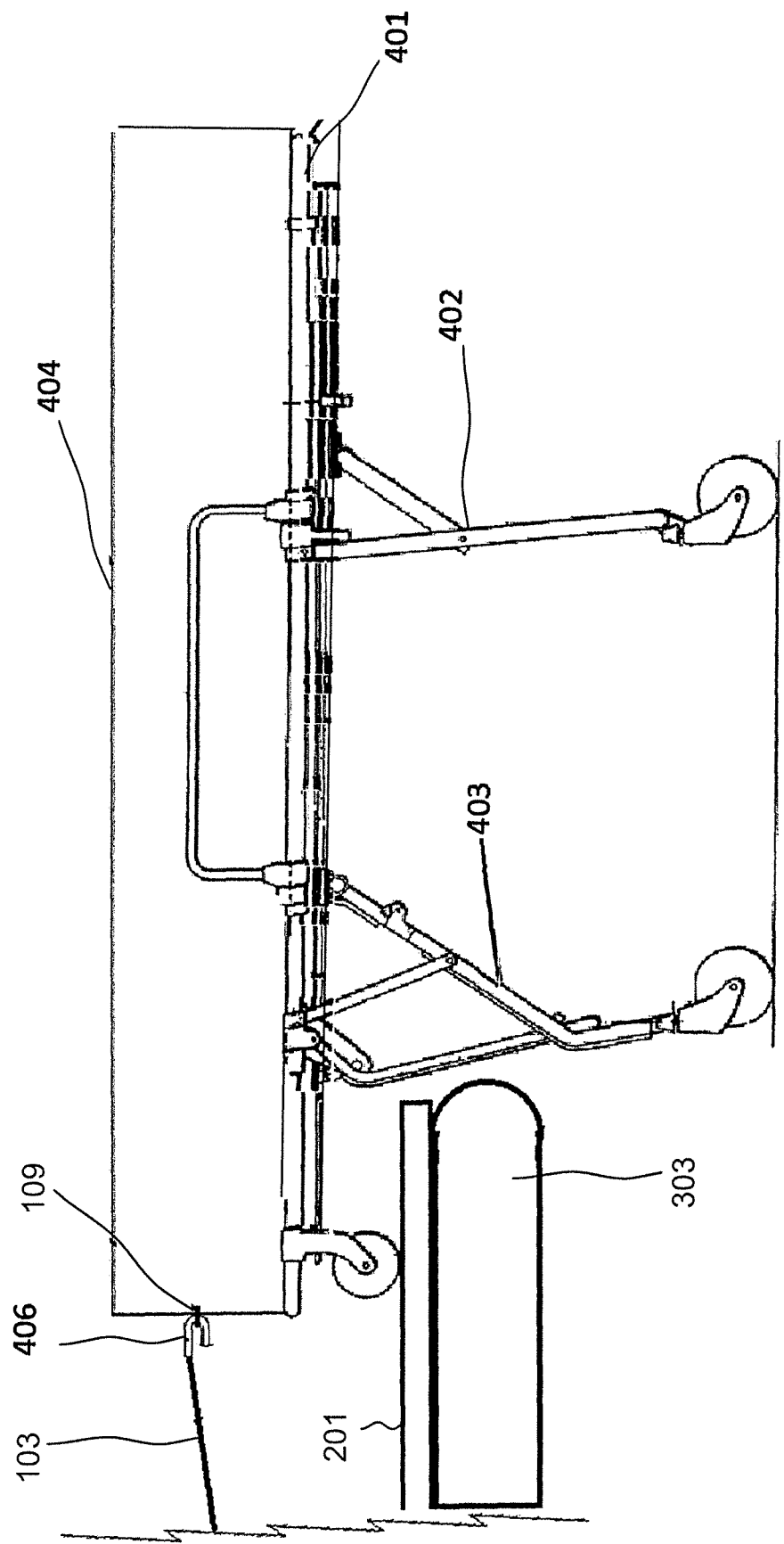
FIG. 8 depicts a side cut away view of vehicle being loaded with a stretcher and mortuary cargo being pulled onto a transport bed, in accordance with an aspect of the present invention.
Figure 9:
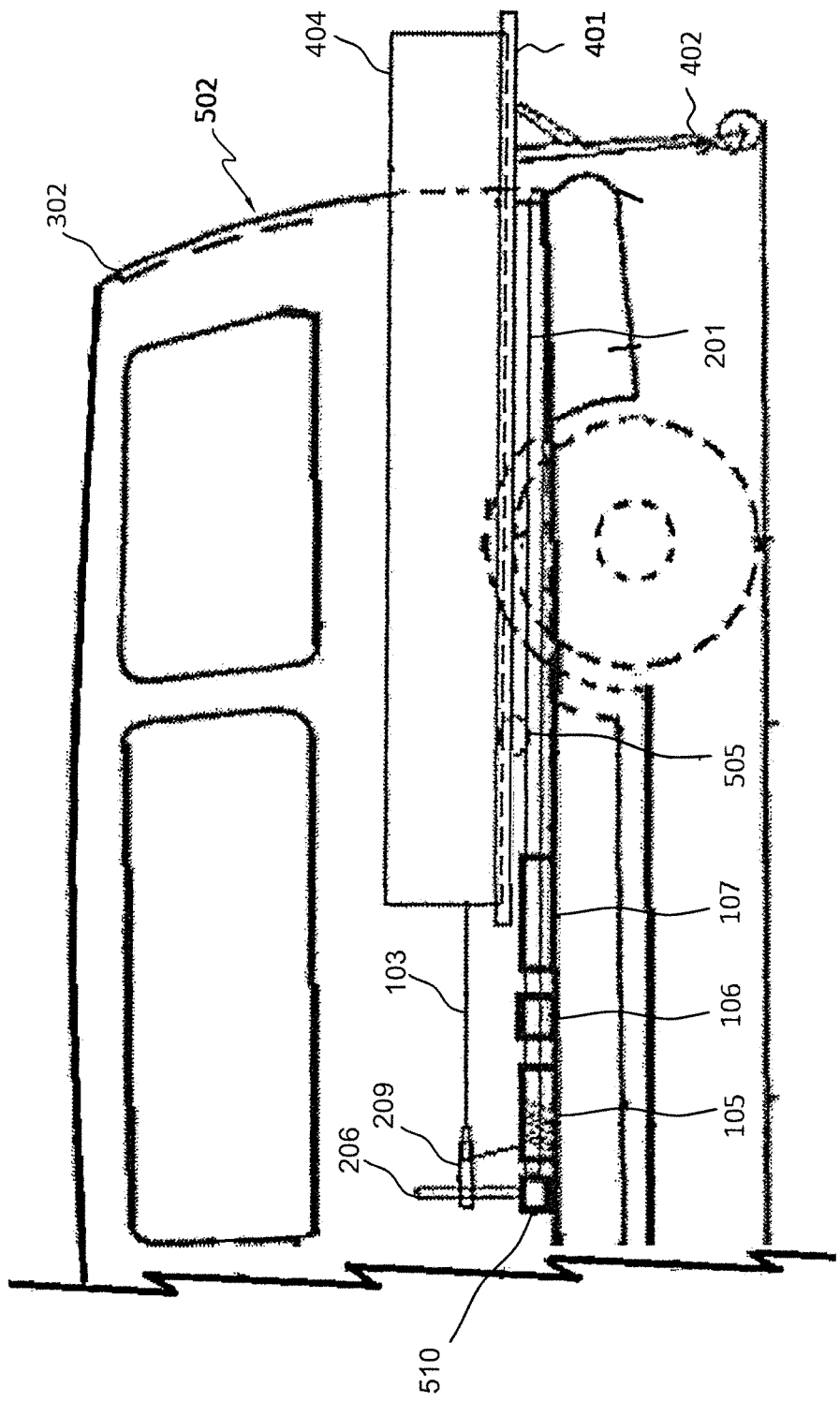
FIG. 9 depicts a side cut away view of vehicle being loaded with the stretcher and mortuary cargo of FIG. 8, with the stretcher front legs folded and mortuary cargo being pulled onto a transport bed, in accordance with an aspect of the present invention.

With reference to FIGS. 8 and 9, a mortuary stretcher 401 and a mortuary cargo 404 are shown being pulled into the mortuary vehicle 302 and into the mortuary vehicle cargo space 502. The mortuary stretcher 401 and the mortuary cargo 404 are shown being pulled onto a mortuary bed 201. A cable 103 with a cable connector 406 is shown connected to a mortuary cargo connector 109. As winch 105 winds the cable 103, pulling the mortuary cargo 404 and mortuary stretcher 401 onto the mortuary bed 408, the front legs 403 collapse, either as they came in contact with the mortuary vehicle bumper 303 or using a lever controlled by a user. The user may, for example, be able to stop and start the motorized winch 105 either directly through the control box 106 or using a remote control (not shown) sending a signal to the control box 106. The motorized winch 105 may, for example, reel in the cable 103 and pull the mortuary cargo 404 and mortuary stretcher 401. The mortuary stretcher 401 may be helped to move smoothly along the mortuary bed 201 because the front wheel 505 of the mortuary stretcher may be in contact with the mortuary bed 201. As the mortuary stretcher 401 continues onto the mortuary bed the rear legs 402 collapse, either as they come in contact with the mortuary vehicle bumper 303 or using a lever controlled by the user. As the legs collapse, the user may, for example, continue using the motorized winch 105 to keep the stretcher 401 moving onto the mortuary bed 201. The cable 103 may be, for example, pulled by the motorized winch 105 around a cargo stopper 206 and a removable pulley 209. With reference to FIG. 9, cargo stopper 206 is depicted as being inserted into cargo support bar 510, and cargo support bar 510 is positioned at the front end of mortuary bed 201.

In embodiments where a stretcher does not have collapsible legs, the mortuary cargo 404 may be pulled up onto the mortuary bed 201 directly from the stretcher while the stretcher remains outside the mortuary vehicle 302. A ramp may be used in other embodiments to help guide and to aid in loading the mortuary cargo, particularly if there are height differences between the carrier and the mortuary bed 201. Casket stands and other similar carriers may not be able to adjust for height differences and may use the same loading method and configuration as with a stretcher without collapsible legs.

Figure 10:
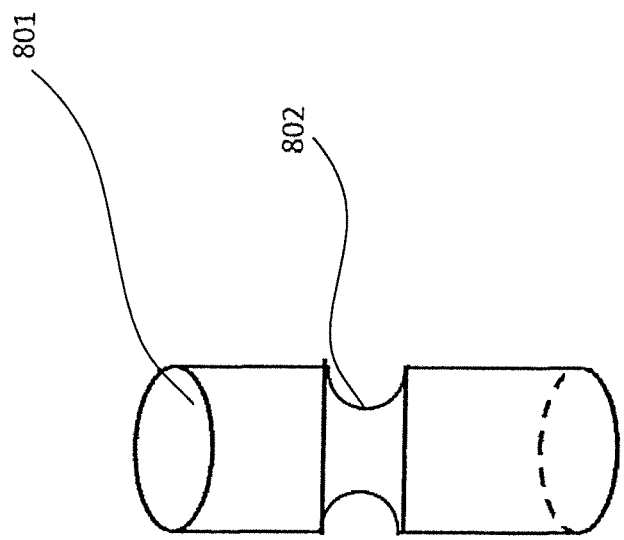
FIG. 10 depicts a perspective view of a cargo stopper with a cable guide groove, in accordance with an aspect of the present invention.

With reference to FIG. 10 a cargo stopper 801 with a cable guide groove 802 is shown. This is another embodiment of cargo stopper 104, 205, 206, and 207. Cable guide groove 802 may be an indentation or a concave region extending around a circumference of the cargo stopper 801. The cargo stopper 801 may have, for example, the cable 103 to pass around the cargo stopper 801 along groove 802 so as to inhibit the cable 103 from moving upwards in the longitudinal direction of cargo stopper 801.

The embodiment of FIG. 11, shows a removable pulley 108, 205 with the fixed eye 701, and a single sheave 705 circumference, with a pulley flange 704 around the single sheave 705 circumference of the pulley wheel 700; the pulley wheel center 706 may rotate about an axle or rotate about a bearing and axle combination. A cable (not shown) may, for example, be inserted into the removable pulley and the cable constrained from moving beyond the pulley flange 704 in a vertical direction and out from the pulley sheave when pulling cargo, due to the presence of a pulley housing, a pulley casing, a block, a pulley block, or the snatch block 703. The fixed eye 701 is shown as a hole or bore but may also be any form of pulley block connector including hooks or shackles. It may be desirable that the pulley block connector be fixed but that a hook or a shackle connector may swivel. The pulley wheel may have, for example, a diameter of between approximately 2 in and 8 in, and more specifically, a diameter of approximately 3 in.

FIG. 12 and FIG. 13 show another embodiment of a removable pulley. The cargo stopper 104 may act as an axle for a pulley 1002 with a bearing 1004 within in a pulley wheel center 1003. The pulley wheel center 1003 may be placed onto cargo stopper 104. The pulley 902 may be without a bearing so that the pulley 902 may be, for example, placed on the cargo stopper 104 and the cargo stopper 104 may, for example, act as an axle.

Alternate embodiments may place the without bearing pulley 902 or with bearing pulley 1002 onto cargo stopper 104 so that they are not removable or not easily removable by a user without tools. The cargo stopper 104 may have flared ends or washer/nut combinations that may, for example, screw onto the cargo stopper 104. In still other embodiments, a cargo stopper may be constructed with an affixed, non-removable, pulley (e.g. the pulley 902 and the pulley 1002).

Figure 14:
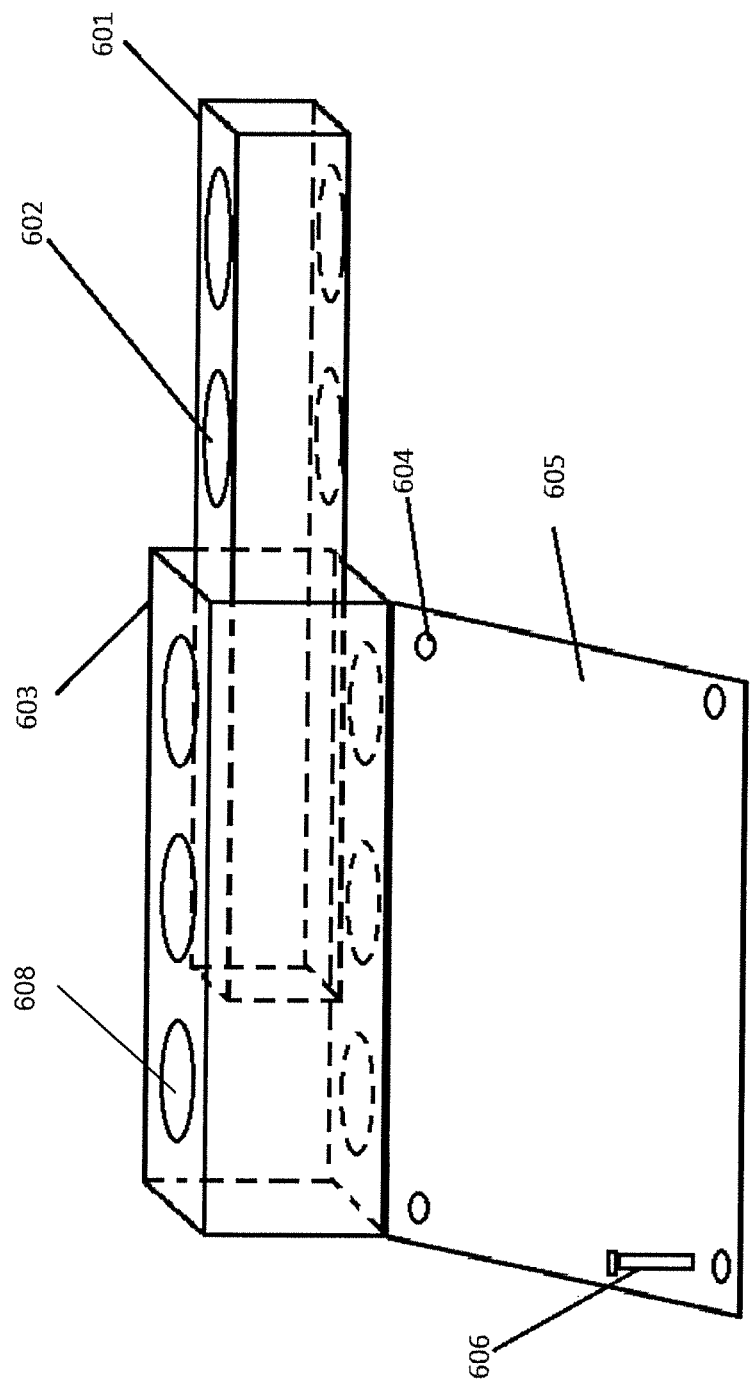
FIG. 14 depicts a perspective view of a cargo stopper support bar and vehicle mounting place, in accordance with an aspect of the present invention.
Figure 15:
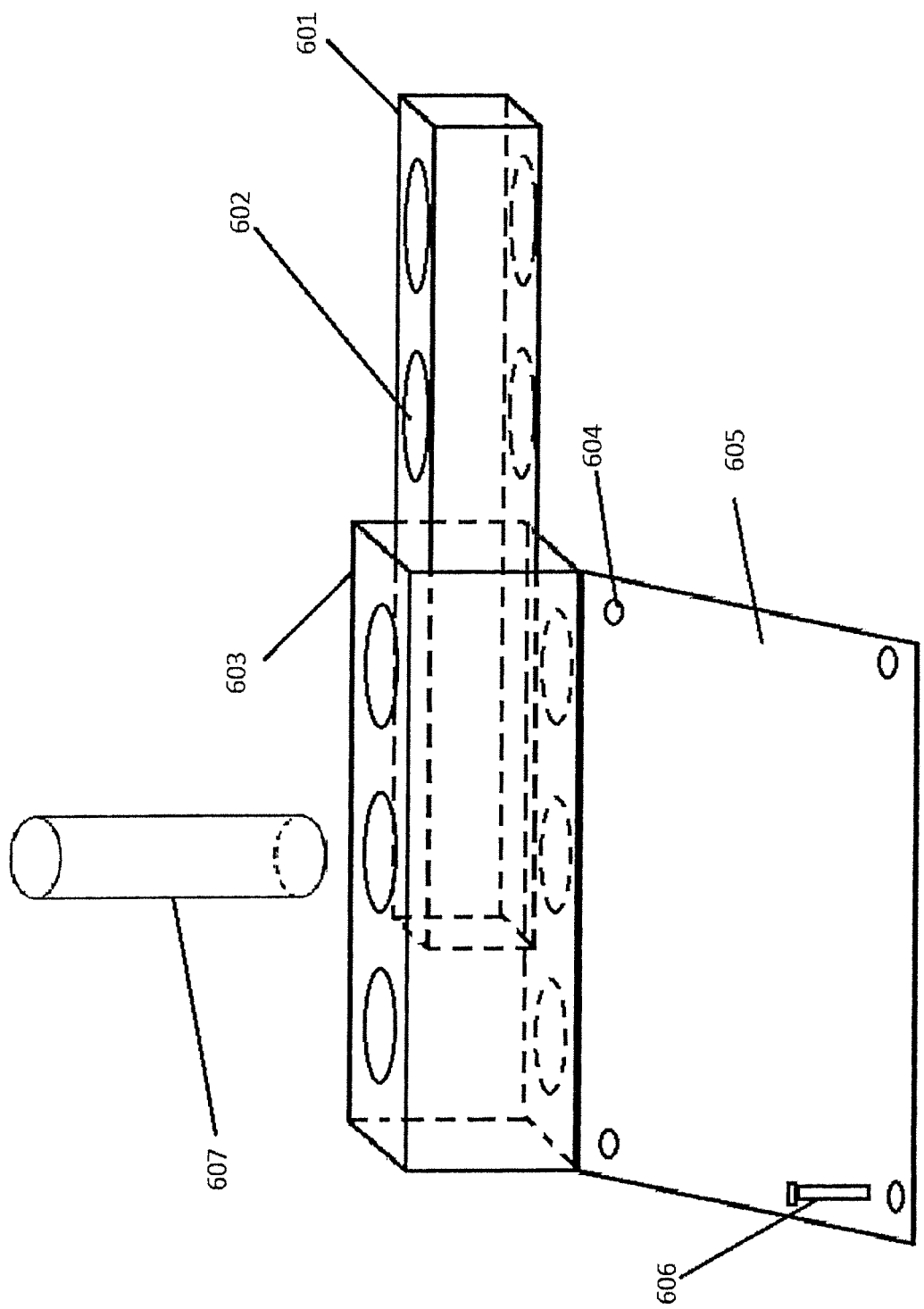
FIG. 15 depicts a perspective view of the cargo stopper support bar of FIG. 14 with a cargo stopper, in accordance with an aspect of the present invention.

With reference to FIG. 14 and FIG. 15 a cargo stopper support in the form of a cargo stopper support bar 603 with an extension bar 601 is shown. The cargo stopper support bar 603 may be used in situations where a mortuary vehicle already has a mortuary bed in place or there is a removable mortuary bed (e.g. 101 and 201). The cargo stopper support bar 603 is depicted as being hollow and having an open end into which the extension bar may be inserted. A mounting plate 605 may be affixed to the floor of a mortuary vehicle. Mounting holes 604 and bolts 606 are shown in this embodiment but other connecting means, such as welding, riveting, gluing, chemically bonding, or nailing may be used to connect the mounting plate 605 to a mortuary vehicle. The extension bar 601 may be expanded to, for example, accommodate single or double mortuary beds (e.g. 101 or 201). Aligning a hole 608 in the cargo stopper support bar 603 with a hole 602 in the extension bar 601 may provide, for example, an insertion point for a cargo stopper 607. The extension bar 601 may be, for example, prevented from sliding into cargo stopper support bar 603 by a locking mechanism (not shown) or by the insertion of the cargo stopper 607 into the hole 608 in the cargo stopper support bar 603 and/or the hole 602 in the extension bar 601. The cargo stopper 607 may be one of a plurality of cargo stoppers and cargo stopper 607 may also, for example, be directly inserted into hole 602 or into hole 608, without aligning holes from the cargo stopper support bar 603 and holes in extension bar 601. Cargo stopper 607 may be, for example, another embodiment of cargo stopper 104, 205, 206, and/or 207. Furthermore, support bar 510, identified in FIG. 9, may be an embodiment of the cargo stopper support bar 603 and the cargo support bar 510 may be a further embodiment of the cargo support bar 603 and extension bar 601. Cargo support bar 603 and the extension bar 601, may be, for example, fastened or welded to a floor of a mortuary vehicle upon expansion to the desired length. The cargo stopper 607, may be removable from support bar 603 and extension bar 601. The cargo stopper 607, may, for example, be welded or screwed into support bar 603 and/or the extension bar 601.

Mortuary beds (e.g. 101 and 201) may be, for example, removable from the mortuary vehicle or they may be connected to the mortuary vehicle using, for example, welding. Removable fasteners, such as, for example, bolts, pins, and screws may be used to provide for mortuary bed removal. In other embodiments, removable mortuary beds may or may not be fastened to the vehicle and they may, for example, rely on the weight of the mortuary bed to remain in place. In other embodiments, mortuary beds may also, for example, be mounted on tracks that allow the mortuary bed to slide in and out of a vehicle along tracks, with the mortuary bed connected to the track, and with the track connected to the floor. Mortuary beds on tracks may be removable. The mortuary bed may also, for example, fold when not in use to accommodate limited vehicle space.

FIG. 14 and FIG. 15 show a mounting plate 605 which may, for example, connect to the floor of the mortuary vehicle. The cargo stopper 607 may, for example, remains fixed in place when inserted into the cargo stopper support bar 603 and/or the extension bar 601. There may be embodiments where an extension bar 601 is not necessary because the cargo stopper support bar 603 is of a width to accommodate the width of the mortuary vehicle cargo space. Cargo support bar 603, may be, for example, fastened or welded to a floor of the mortuary vehicle cargo space. Alternate embodiments of cargo stopper support bar 603 with or without an extension bar 601 where the cargo stopper support bar 603 may be, for example, attached to front seats of a mortuary vehicle. Front seats may, for example, be a driver's seat, a front passenger seat, and any similarly positioned seat at the front of the vehicle cabin space or within the driver space. The front seat attachment may be at or around the base of the front seat. The front seat attachment may be connected to at least one location, with other embodiments having a chain around the base of a front seat and a chain about the head-rest of the front seat (not shown). At least one cable may be used to attach the cargo stopper support bar or the mounting plate 605 to at least one front seat. In yet other embodiments, a clamping mechanism may be used to affix the mounting plate 605 and/or the cargo stopper support bar 603 to the at least one front seat. The mounting plate 605 may be vertically mounted to the back of at least one mortuary vehicle seat. Other seat connection means such as screwing, welding, tying, gluing, or chemically bonding the cargo stopper support bar to at least one mortuary vehicle seat may be used. The cargo stopper support bar 603 and the extension bar 601, may be, for example, fabricated from a polymer or metal for use in high load bearing environments, and more specifically, the cargo stopper support bar 603 and the extension bar 601 may be, for example, fabricated from steel.

Figure 16:
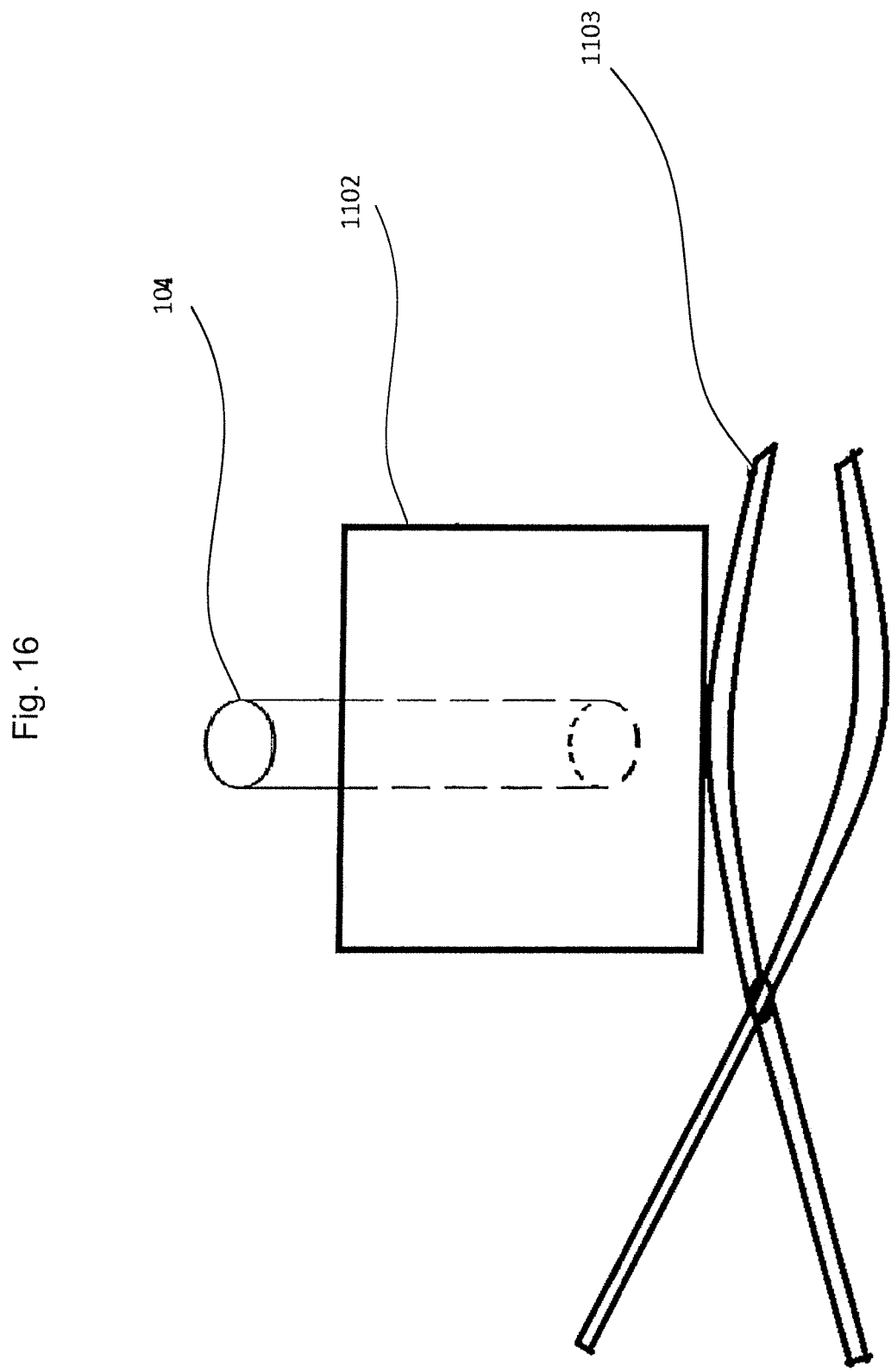
FIG. 16 depicts a side view of single cargo stopper with a clamp mounting mechanism, in accordance with an aspect of the present invention.

With reference to FIG. 16, the cargo stopper 104 is shown inserted into a slot of a support bar 1102 having a clamp mounting mechanism 1103. The support bar, 1102 may have, for example at least one slot having an opening on the top side of the support bar, into which the cargo stopper 104 is engaged. The clamp mounting mechanism 1103, may have, for example, a handle end, which when compressed, opens a jaw end. The jaw end may be affixed about a desired support, and upon releasing the handle end, the jaw end grasps the desired support. Alternate embodiments may have a single slot or a multi-slot support bar with slots or holes for 1-3 cargo stoppers 104. The support bar 1102 may further be an embodiment of the support bar 603 with the extension bar 601, as shown in FIGS. 14-15, to, for example, accommodate more than 3 cargo stoppers 104 or to accommodate spacing of cargo stoppers 104. A single slot support bar 1102 may, for example, require a single clamp 1103. However, a multi-slot support bar (e.g. support bar 603) and/or an expandable support bar (e.g. 601) may, for example, require a plurality of clamps (e.g. multiple instances of clamp mounting mechanism 1103) to accommodate a firm grip to the single mortuary bed 101 or the double mortuary bed 201. In other embodiments, the clamp mounting mechanism 1103 may be mounted to front seats of the mortuary vehicle.

Figure 17:
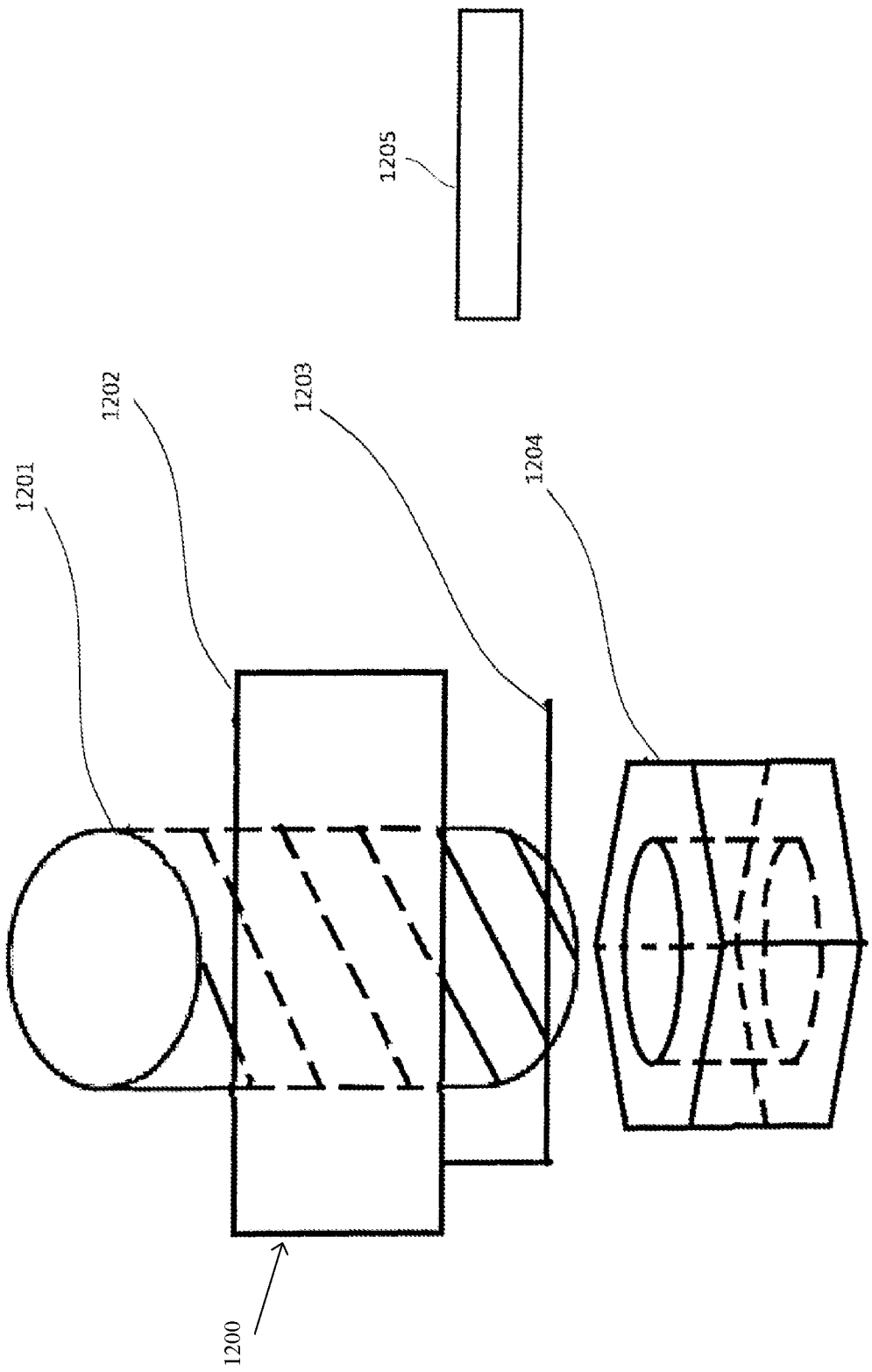
FIG. 17 depicts a side view of a cargo stopper and screw clamp mechanism, in accordance with an aspect of the present invention.

With reference to FIG. 17 a cargo stopper 1201 with screw clamp mechanism 1200 is shown. The cargo stopper 1201, having threading, and is shown inserted into a support bar 1202 having a screw clamp mounting plate 1203 and with a nut 1204 beneath. The support bar 1202 may have, for example, a single slot. The clamp mounting plate 1203 may, for example, be affixed to the single slot support bar 1202. In embodiments where a mortuary bed 1205 may be, for example, inserted between the support bar 1202 and the clamp mounting plate 1203, the cargo stopper 1201 may be screwed into the single slot support bar 1202, pinning the mortuary bed 1205 between the cargo stopper 1201 and the clamp mounting plate 1203. Holes may, for example, be made in the mortuary bed 1205 to accommodate the cargo stopper 1201 and corresponding holes may further be made in the clamp mounting plate 1203. The holes may, for example, further have threading. The cargo stopper 1201 may be, for example, screwed into the cargo support bar 1202, through the mortuary bed 1205, through the clamp mounting plate 1203, and using a nut 1204 to keep the configuration in place. In an alternate embodiment, the cargo stopper 1201 may be, for example, screwed into the cargo support bar 1202, through the mortuary bed 1205, through the clamp mounting plate 1203, and into threaded holes made in the floor of a mortuary vehicle. Alternate embodiments may have a multi-slot support bar with slots or holes for more than one cargo stopper, and the support bar 1202 may have an extension bar 601 to accommodate more cargo stoppers or to accommodate spacing of cargo stoppers. The clamp mounting plate may be affixed to the multi slot support bar and may be the width of the multi slot support bar. Embodiments may also a clamp mounting plates that are spaced in conjunction with the support bar holes. Such a mechanism may be, for example, compatible with a single mortuary bed 101 or a double mortuary bed 201.

Figure 18:
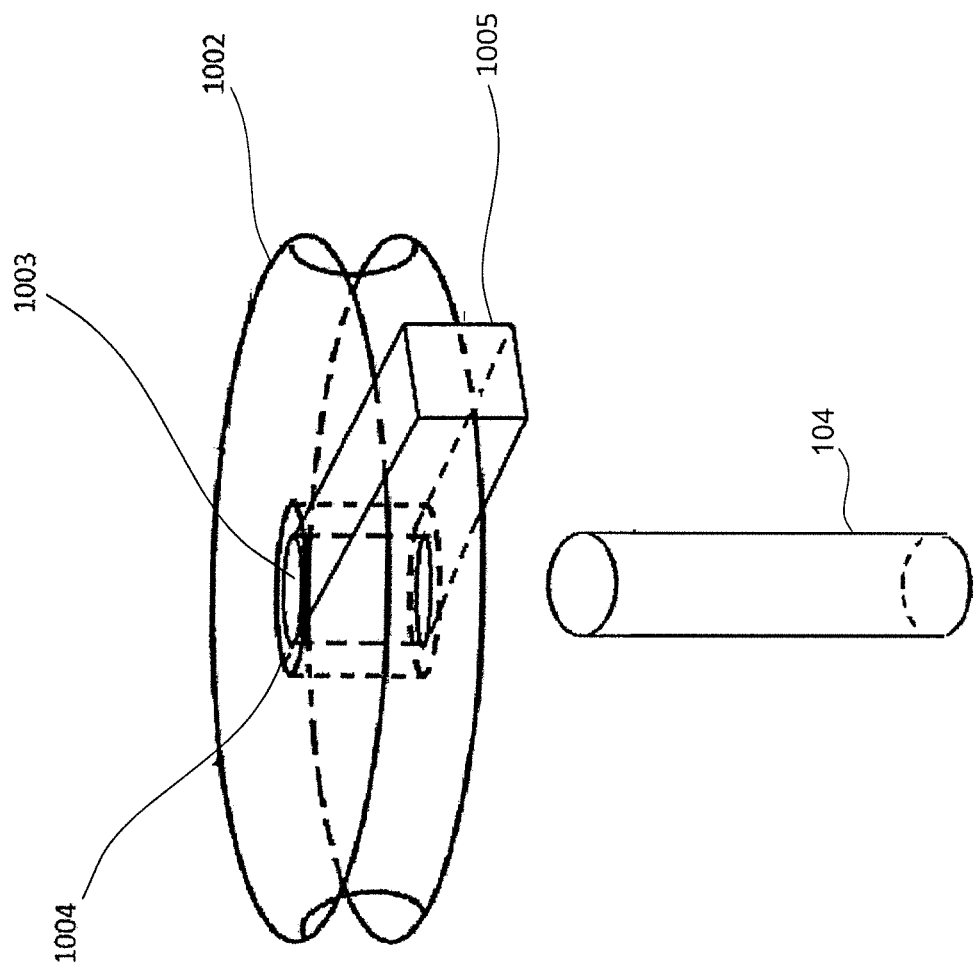
FIG. 18 depicts a perspective view of a cargo stopper with a removable pulley and bearing and a cable guard, in accordance with an aspect of the present invention.

With reference to FIGS. 2, 5, and 18 a cargo stopper 104 and a removable pulley 1002 having a center hole 1003, a bearing 1004, and a cable guard 1005, are shown. A cable 103 may be threaded between the pulley 1002 and the cable guard 1005, and placed on the cargo stopper 104 such that cargo stopper 104 enters center hole 1003.

Figure 19:
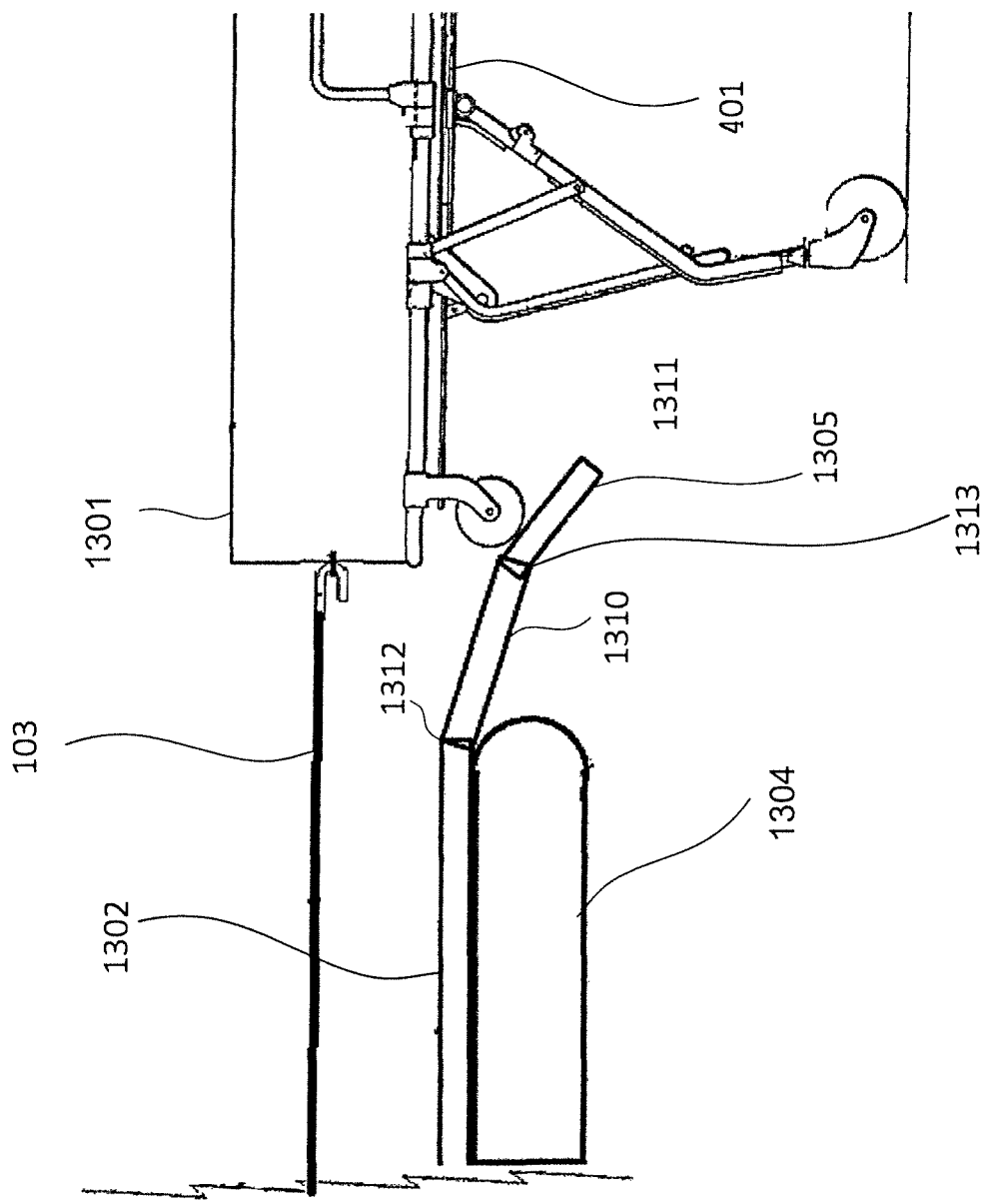
FIG. 19 depicts a side view of a side cut away view of vehicle being loaded with a stretcher and mortuary cargo, onto a transport bed with a ramp, in accordance with an aspect of the present invention.

With reference to FIG. 19 a mortuary vehicle is shown with a mortuary stretcher 1306 and mortuary cargo 1301, being loaded onto a mortuary bed 1302 with a dual ramp 1305. The mortuary bed 1302 is shown connected to a dual ramp 1305, with the dual ramp 1305 connected at the end of the mortuary bed 1302 and extending out of the mortuary vehicle to below the bumper 1304. The loading wheels of the mortuary stretcher 1306 are shown making contact with the ramp 1305, may provide, for example, for easier loading of the mortuary cargo 1301 as the wheel slide up the ramp 1305. The dual ramp 1305 may be, for example, connected to the mortuary bed 1302 by a hinged mechanism 1312. The hinged mechanism 1312 may be, for example, configured to allow the first ramp 1310 to drop up to 30 degrees below the horizontal plane of the mortuary bed 1302. The second ramp 1311, connected by a second hinged mechanism 1313, may be, for example, configured to drop up to 30 degrees below the horizontal plane of the first ramp 1310. In other embodiments, a single ramp configuration may also be used.

Figure 20:
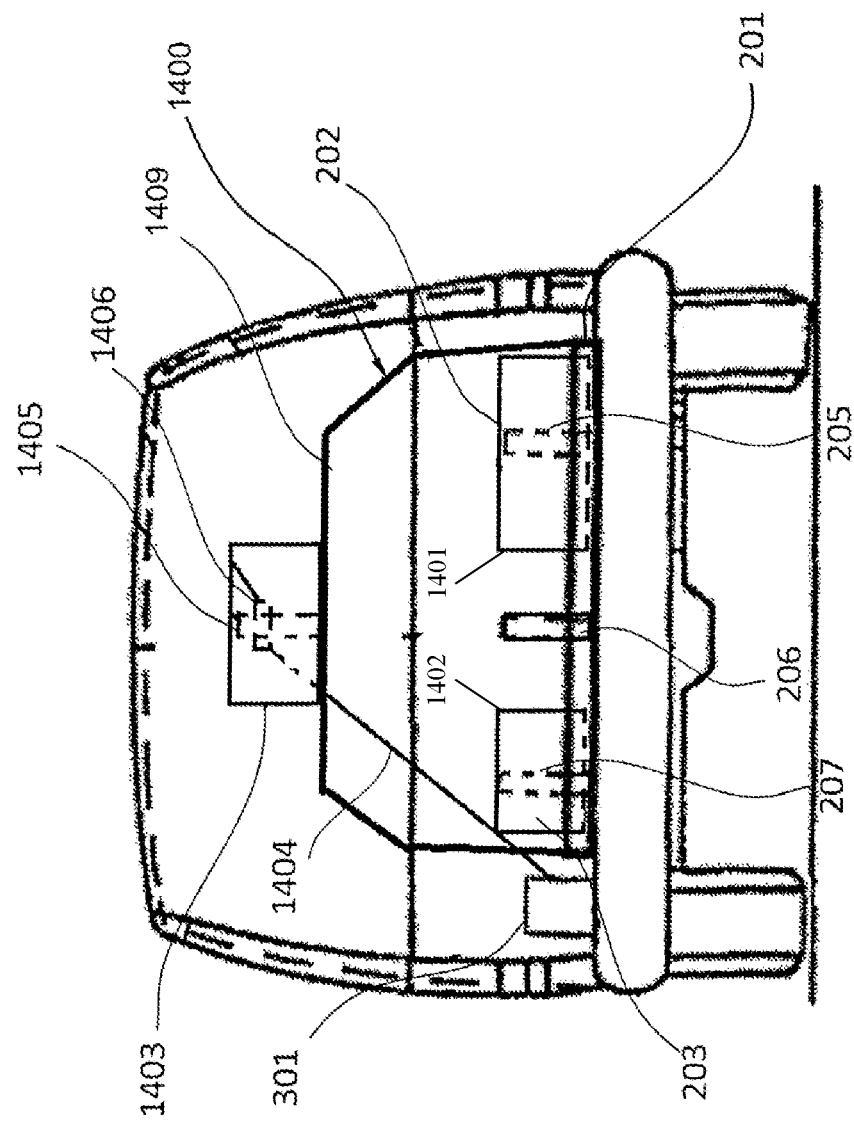
FIG. 20 depicts a rear view of a mortuary vehicle having a mortuary cargo loading system with a double deck cargo configuration, in accordance with an aspect of the present invention.

The embodiment of FIG. 20 depicts a rear view of a mortuary vehicle having a mortuary cargo loading system with a double deck cargo configuration 1400. The mortuary vehicle cargo space is shown with the double bed mortuary bed 201 having a first mortuary cargo 1402 in front of a first cargo stopper 205, a second cargo stopper 206, and a second mortuary cargo 1401 in front of a third cargo stopper 207. A cable 1404 is shown between a pulley 1406 and mounted on a fourth cargo stopper 1405 and the cable 1404 is shown connected to a power system 301. A third mortuary cargo 1403 and the fourth cargo stopper 1405 are shown on a deck frame 1409. The third mortuary cargo is shown in front of the pulley 1406 mounted on a fourth cargo stopper 1405. The pulley 1406 mounted on a fourth cargo stopper 1405 may be, for example, mounted to the deck frame 1409. For the sake of brevity, the connections for fourth cargo stopper 1405 to deck frame 1409 will not be described as several cargo stopper connections have already been described for use with single mortuary tray 101 and double mortuary tray 201. The only difference is that deck frame 1409 is shown positioned above mortuary tray 201. The cargo stopper 1405 may be affixed to the deck frame 1409 or to a cargo stopper support bar or cargo stopper support bar extension bar.

With reference to FIG. 1-9, 14-21, a cargo stopper 1500 is shown, with a cap 1503, a body 1502, and a sleeve, bushing, or pulley wheel 1501 positioned around the body 1502, such that the sleeve may rotate about the body 1502. The body 1502 may be inserted into a mortuary bed (e.g. mortuary bed 101 and mortuary bed 201) or inserted into a cargo stopper support bar (e.g. the cargo stopper support bar 603, the extension bar 601, cargo support bar 510, the support bar 1202 and the support bar 1102). The body may have, for example, threading for connection to the support bar 1202. The cable 103 (and the cable 1404) may be, for example, placed against sleeve 1501, rotating the sleeve 1501 around the body 1502 as the mortuary cargo (e.g. 102, 202, 203, 404, and 1405) is being reeled on the mortuary tray (e.g. the mortuary tray 101, the mortuary tray 102, and deck frame 1409).

In other embodiments, the cargo stopper 104 may have a straight end for engagement with the cargo stopper support bar 603, the extension bar 601, the mortuary bed 102, the mortuary bed 202, or the deck frame 1409. The cargo stopper may from the straight engaged end to, for example, a hooked opposing end or angled opposing end. The cargo stopper may, for example, have a sleeve 1501 on the straight end. In yet other embodiments, the cargo stopper with the hooked or angled opposing end may provide for a connection with the eye 701 as shown in FIG. 11.

With reference to FIGS. 1, 4, 7-9, 14-17, and 19-21, a method includes bringing the mortuary cargo 102 to an opening to the cargo space 502 of a mortuary vehicle 302 and opening the rear door or gate. Passing the cable 103 around the cargo stopper 104. Connecting the cable to the mortuary cargo 102 or a stretcher bearing the mortuary cargo 102. Activating the winch 105. Pulling the cable 103 around the cargo stopper 104. The winch, pulling the mortuary cargo 102 towards the cargo space 502. Pausing the winch 105 to collapse segments of the stretcher and activating the winch after the segments have collapsed. Pulling the mortuary cargo 102 into the cargo space 502. Stopping the winch 105 when the mortuary cargo is within the cargo space 502. Inserting the rear cargo stopper 115 into a slot within the mortuary tray 101.

With reference to FIGS. 1-21 a method includes bringing the mortuary cargo 102 to an opening to the cargo space 502 of the mortuary vehicle 302 and opening the rear door or gate. Attaching the pulley 108 to the cargo stopper 104. Passing the cable 103 around the pulley 104. Connecting the cable 103 to the mortuary cargo 102 or a stretcher bearing the mortuary cargo 102. Activating the winch 105, and the winch pulling the cable 103 around the pulley 108. Pulling the mortuary cargo 102 towards the cargo space 502. Pausing the winch 105 to collapse segments of the stretcher and activating the winch after the segments have collapsed. Pulling the mortuary cargo 102 into the cargo space 502. Stopping the winch 102 when the mortuary cargo is within the cargo space 502. Inserting the rear cargo stopper 115 into a slot within the mortuary tray 101.

With reference to FIGS. 1-21, the methods for loading mortuary cargo have been described for mortuary cargo loading system 100, but also apply to double bed mortuary cargo loading system 200, as would be understood by one having ordinary skill in the art.

While loading of mortuary cargo has been described, one of ordinary skill in the art would understand that this system may be used for unloading. When mortuary cargo (e.g. mortuary cargo 102) is pulled out of the cargo space, the cable 103, connected via the cargo stopper 104 to the mortuary cargo 102 may be slowly unwound from the winch, to provide for controlled cargo removal and additional load support.

As may be recognized by those of ordinary skill in the art based on the teachings herein, numerous changes and modifications may be made to the above-described and other embodiments of the present disclosure without departing from the scope of the disclosure. The components of the mortuary cargo loading system as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the mortuary cargo loading system may include more or fewer components or features than the embodiments as described and illustrated herein. For example, the components and features of FIGS. 1-21 may be used interchangeably and in alternative combinations as would be modified or altered by one of skill in the art. Specifically, the mortuary beds 101 and 202, the cargo stoppers 104, 205, 206, 207, 801, 1201, 1405, 1500, and other described cargo stoppers, the pulleys 108, 110, 222, 208, 209, and 210, and the support bars 601, 603, 1102, and 1202 may be used in alternative combinations as would be modified or altered by one of skill in the art. Accordingly, this detailed description of the currently-preferred embodiments is to be taken in an illustrative, as opposed to limiting of the disclosure.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A mortuary cargo loading system comprising:
    a transport bed positioned on a surface within a cargo space of a passenger vehicle, said transport bed comprising a front end positioned behind a driver space of the passenger vehicle, a back end positioned toward a loading end of the cargo space, a first side, and a second side;
    a power system connected to the first side of the transport bed, said power system comprising a motorized winch, a battery, and a control system;
    a cable engaged with and extending from the motorized winch towards a free end having a connector;
    a cargo stopper comprising a bar having a first end, a second end, and a guide therebetween, said guide comprising a pulley engagable with the cable; and
    a cargo stopper support positioned at the front end of the transport bed and connected to the surface of the cargo space, said cargo stopper support having at least one bore for receiving the first end of the cargo stopper and the cargo stopper extending from the at least one bore towards the second end;
    wherein the connector is connected to a mortuary cargo, and by operation of the motorized winch, the mortuary cargo is pulled onto the transport bed and inhibited from moving past the cargo stopper; and
    wherein the cargo stopper further inhibits the mortuary cargo from moving past the cargo stopper during operation of the passenger vehicle.

2. The mortuary cargo loading system of claim 1, wherein the cargo stopper support further comprises a hollow interior, an open end, and an extension bar, movably extendable from the open end of the cargo stopper support, said extension bar inserted into and extending from the open end, and said extension bar having a plurality of bores for receiving the cargo stopper.

3. The mortuary cargo loading system of claim 1, wherein the transport bed further comprises:
    a first ramp having a first hinged mechanism pivotally connected to the back end of the transport bed, said first ramp being pivotable to an angle extending from and below the transport bed; and
    a second ramp having a free end and a second hinged mechanism, said second hinged mechanism pivotally connected to the first ramp, and said second ramp being pivotable to an angle extending from and below the first ramp towards the second ramp free end;
    wherein the second ramp free end is elevated;
    wherein through operation of the first hinged mechanism and the second hinged mechanism the first ramp and second ramp extend outside the vehicle cargo space below a vehicle bumper towards the second ramp free end in an open position and into the vehicle cargo space in a closed position.

4. The mortuary vehicle cargo loading system of claim 3 further comprising a second transport bed, wherein the second transport bed is positioned on a deck frame.

5. The mortuary cargo loading system of claim 1, wherein the connector connected to the mortuary cargo and the cargo stopper define an axis, and by operation of the motorized winch, the cargo is pulled onto the transport bed along the axis, in alignment with the cargo stopper.

6. The mortuary cargo loading system of claim 1, wherein the passenger vehicle is selected from a group consisting of a van, a mini-van, a pick-up truck, a sports utility vehicle, a station wagon, a hatchback, a crossover vehicle, or an automobile with a cargo bed.

7. A kit comprising:
    a mortuary bed having a front end, a back end, a first side, and a second side;
    a power system comprising a motorized winch, a control box, and a power supply connected to the first side of the mortuary bed;
    a cable having a connector at a first end and a second end, said second end being engaged with the motorized winch;
    a pulley;
    a plurality of cargo stoppers;
    a cargo stopper support having a plurality of bores for engaging one of the plurality of cargo stoppers;
    a dual ramp, said dual ramp comprising a first ramp having a first hinged mechanism connected to the back end of the mortuary bed and a second ramp having a free end and a second hinged mechanism connected to the first ramp; and
    a plurality of fasteners;
    wherein pivoting the second ramp about the second hinged mechanism and pivoting the first ramp about the first hinged mechanism to extend the ramp below a vehicle bumper with the free end remaining elevated, connecting the power system, the mortuary bed, and the cargo stopper support to a mortuary vehicle, engaging a pulley to one of the plurality of cargo stoppers, engaging one of the plurality of cargo stoppers with the cargo stopper support, and attaching the cable to the pulley allows for a mortuary cargo loading into the mortuary vehicle and inhibits the mortuary cargo from moving past the cargo stopper during the mortuary cargo loading and operation of the mortuary vehicle.

8. A method of loading mortuary cargo comprising:
    bringing a mortuary stretcher to a cargo space opening of a mortuary vehicle;
    extending a first ramp from a transport bed and extending a second ramp from the first ramp;

inserting a cargo stopper, said cargo stopper having a pulley, into a cargo stopper support bar having at least one bore for accommodating the cargo stopper;

passing a cable around the pulley;

connecting the cable to the mortuary stretcher and forming an axis between the pulley and the mortuary stretcher;

activating a winch, said winch positioned at a side of the transport bed;

pulling the mortuary stretcher along the axis;

collapsing a set of front legs on the mortuary stretcher as the mortuary stretcher moves along the second ramp towards the first ramp;

collapsing a set of rear legs on the mortuary stretcher as the cargo stretcher is pulled into the cargo space and onto a mortuary tray;

continuing to pull the mortuary cargo stretcher along the axis until the mortuary stretcher contacts the cargo stopper;

stopping the winch; and inserting a rear cargo stopper into a slot in the mortuary tray behind the mortuary stretcher.

\* \* \* \* \*